United States Patent
Riley et al.

[11] Patent Number: 5,875,391
[45] Date of Patent: Feb. 23, 1999

[54] METHOD OF AND APPARATUS FOR PERFORMING ANTENNA COSITE ANALYSIS

[75] Inventors: Terence Michael Riley, Rockwall; James Higgins, Dallas; Robert S. Mawrey, Plano, all of Tex.

[73] Assignee: UniSite, Inc., Tampa, Fla.

[21] Appl. No.: 686,967

[22] Filed: Jul. 25, 1996

[51] Int. Cl.[6] .............................. H04B 1/10; H04B 1/38
[52] U.S. Cl. ........................ 455/295; 455/63; 455/562
[58] Field of Search .............................. 455/16, 63, 67.3, 455/561, 562, 501, 206, 295, 296, 306, 307, 62; 343/835, 853, 700 R, 702; 370/278; 375/254, 284, 285

[56] References Cited

U.S. PATENT DOCUMENTS

| | | |
|---|---|---|
| 3,916,311 | 10/1975 | Martin et al. . |
| 4,225,966 | 9/1980 | Blow . |
| 4,298,873 | 11/1981 | Roberts . |
| 4,567,591 | 1/1986 | Gray et al. . |
| 4,660,196 | 4/1987 | Gray et al. . |
| 4,872,200 | 10/1989 | Jansen . |
| 5,107,273 | 4/1992 | Roberts . |
| 5,142,691 | 8/1992 | Freeburg et al. . |
| 5,263,191 | 11/1993 | Dickerson . |
| 5,264,862 | 11/1993 | Kumpfbeck . |
| 5,339,456 | 8/1994 | Dickerson . |
| 5,355,533 | 10/1994 | Dickerson . |
| 5,410,737 | 4/1995 | Jones . |
| 5,428,834 | 6/1995 | Dickerson . |
| 5,491,833 | 2/1996 | Hamabe ................................. 455/562 |
| 5,506,863 | 4/1996 | Meidan et al. . |

OTHER PUBLICATIONS

J. Low and A.S. Wong, "Systematic approach to cosite analysis and mitigation techniques," Proceedings of the Tactical Communications Conference, vol. 1, pp. 555–567, Apr. 1990.

P. Alexander, P. Magis, J. Holtzman, S. Roy, "A methodology for interoperability analysis," IEEE Military Communications Conference (MILCOM 89), Boston, MA, pp. 905–910, Oct. 1989.

(List continued on next page.)

*Primary Examiner*—Thanh Cong Le
*Assistant Examiner*—Sam Bhattacharya
*Attorney, Agent, or Firm*—Bryan Cave LLP

[57] ABSTRACT

An antenna cosite analysis system with: interactive displays for i) designing an antenna tower for placement of one or more antennas on the tower, ii) designing wireless communication circuits, and iii) relating the antennas on the tower to the wireless communication circuits; and an RF analysis system for analyzing interference between the wireless communication circuits. A process for determining intermodulation interference between transmitters and one or more receivers includes the steps of: determining a minimum susceptibility of the receivers; determining a highest order intermodulation product generated as a result of interference between the victim transmitter and each other transmitter with a power level sufficient to exceed the minimum susceptibility of the one or more receivers at the victim transmitter; and determining the intermodulation products generated as a result of interference between the victim transmitter and the other transmitters, the intermodulation products being determined up to the highest order intermodulation product of a minimum leakage transmitter-victim transmitter pair. Also disclosed is a process for determining intermodulation interference in a receiver, an apparatus for determining intermodulation interference in transmitter, and an apparatus for determining intermodulation interference in a receiver.

36 Claims, 25 Drawing Sheets

OTHER PUBLICATIONS

M.N. Lustgarten, "COSAM (Co–site Analysis Model)," IEEE Electromagnetic Compatiblity Symposium Record, Anaheim, California, pp. 394–406, Jul. 1970.

J.W. Rockway, and S.T. Li, "Design Communication Algorithm (DECAL), " IEEE International Symposium on Electromagnetic Compatibility, Atlanta, GA, pp. 288–292, Jun. 1978.

L.C. Minor, F.M. Koziuk, J.W. Rockway, and S.T. Li, "PECAL: A New Computer Program for the EMC Performance Evaluation of Communication Systems in a Cosite Configuration," IEEE International Symposium on Electromagnetic Compatibility, Atlanta, GA, pp. 295–301, Jun. 1978.

ComSitePlus User Manual, Douglas Integrated Software, Tallahassee, FL, 1995.

| MAKE | MODEL | TYPE | HEIGHT(IN) | WIDTH(IN) | WEIGHT | FB Start(MHz) | FB Stop(MHz) |
|---|---|---|---|---|---|---|---|
| Generic Microwave | 11GHZMW | Dish | 72 | 36 | 10 | 10700 | 11700 |
| Generic Microwave | 18GHZMW | Dish | 48 | 24 | 10 | 17800 | 18600 |
| Generic Microwave | 21GHZMW | Dish | 48 | 24 | 10 | 21225 | 21775 |
| Generic Microwave | 2GHZMW | Dish | 144 | 72 | 10 | 1900 | 2300 |
| SINCLAIR | 2RM-43716 | | 3 | 19 | 7 | 824 | 849 |
| SINCLAIR | 411C-4R105 | | 53 | 24 | 13 | 824 | 894 |
| SINCLAIR | 411C-4R130 | | 53 | 21 | 13 | 824 | 894 |
| SINCLAIR | 411C-4R160 | | 53 | 12 | 13 | 824 | 894 |
| SINCLAIR | 411C-4R60 | | 53 | 24 | 13 | 824 | 894 |
| SINCLAIR | 411C-4R90 | | 53 | 25 | 13 | 824 | 894 |
| SINCLAIR | 411C-9R105 | | 102 | 24 | 36 | 824 | 894 |

Current Selection: 11GHZMW

| Num | Antenna ID | Type | Client | Status | Length | Width | Elev | Radius | TAngle | HAngle | VAngle |
|---|---|---|---|---|---|---|---|---|---|---|---|
| 6 | 4GHZMW | Dish | MCI | EXISTING | 10.0 | 1.0 | 110.0 | 15.3 | 167.3 | 145.0 | 0.0 |
| 7 | 6GHZMW | Dish | MCI | EXISTING | 10.0 | 1.0 | 254.0 | 22.1 | 273.1 | 250.4 | 0.0 |
| 8 | 6GHZMW | Dish | MCI | EXISTING | 10.0 | 1.0 | 254.0 | 22.0 | 240.9 | 250.4 | 0.0 |
| 9 | ALP9214-N CORNER REF | | MCI | EXISTING | 8.5 | 1.0 | 200.0 | 17.0 | 162.1 | 154.0 | 0.0 |
| 10 | ALP9214-N CORNER REF | | MCI | EXISTING | 8.5 | 1.0 | 200.0 | 11.3 | 235.0 | 240.0 | 0.0 |

| Order | Conversion Loss |
|---|---|
| 2 | -7 dB |
| 3 | -10 dB |
| 4 | -15 dB |
| 5 | -20 dB |
| 6 | -30 dB |
| 7 | -40 dB |
| 8 | -50 dB |
| 9 | -60 dB |
| 10 | -70 dB |
| 11 | -80 dB |

| TXIM | TX A | TX B | TX C |
|---|---|---|---|
| TX A | — | 3 | ? |
| TX B | ? | — | ? |
| TX C | ? | ? | — |

FIG. 25

METHOD OF AND APPARATUS FOR PERFORMING ANTENNA COSITE ANALYSIS

BACKGROUND OF THE INVENTION

1. Field of the Invention

The present invention relates generally to an antenna cosite analysis system, and more particularly to an antenna cosite analysis system that is integrated with a tower and antenna layout system so as to enable more efficient design of antenna towers. The invention also relates to a faster antenna cosite analysis system in which intermodulation products that are not capable of causing interference are not processed.

2. Description of the Related Art

Antennas for wireless communication systems are often positioned on towers to improve the operating distance of the systems. Cellular telephone, AM/FM radio, paging services, and mobile telephone are just a few examples of wireless systems that utilize tower-mounted antennas. In order to reduce the cost of maintaining such towers and of operating wireless services, it is preferable for as many wireless systems as possible to use a given tower.

When multiple transmitters, receivers, and/or antennas are located on a tower, several types of interference may occur. Intermodulation occurs when the RF signal from one transmitter at the site leaks into other transmitters or receivers at the site causing intermodulation products to be generated. If the intermodulation products occur in a transmitter, they may escape from the transmitter and cause interference in the receivers at the site.

Another type of interference occurs when noise from the transmitters at the site interferes directly with the receivers at the site. A still further type of interference occurs when the power of the transmitters leaks into the receivers, thereby desensitizing the receivers.

Systems have been developed that predict the extent of interference between transmitters and receivers at a shared radio site. Such systems are described, for example, in the following documents, the contents of which are incorporated herein by reference for all purposes:

1) M. N. Lustgarten, "COSAM (Co-site Analysis Model)," IEEE Electromagnetic Compatibility Symposium Record, Anaheim, Calif., pp. 394–406, July 1970;
2) J. W. Rockway, and S. T. Li, "Design Communication Algorithm (DECAL)," IEEE International Symposium on Electromagnetic Compatibility, Atlanta, Ga., pp. 288–292, June 1978;
3) L. C. Minor, F. M. Koziuk, J. W. Rockway, and S. T. Li, "PECAL: A New Computer Program for the EMC Performance Evaluation of Communication Systems in a Cosite Configuration," IEEE International Symposium on Electromagnetic Compatibility, Atlanta, Ga., pp. 295–301, June 1978;
4) P. Alexander, P. Magis, J. Holtzman, S. Roy, "A methodology for interoperability analysis," IEEE Military Communications Conference (MILCOM 89), Boston, Mass., pp. 905–910, October 1989;
5) J. Low and A. S. Wong, "Systematic approach to cosite analysis and mitigation techniques," Proceedings of the Tactical Communications Conference, vol. 1, pp. 555–567, April 1990; and
6) ComSitePlus User Manual, Douglas Integrated Software, Tallahassee, Fla., 1995.

When the interference between the communication circuits on a tower exceeds a desired threshold, the antennas, transmitters and receivers at the site may be relocated or additional filtering elements may be added to the communication circuits in order to reduce the interference to within acceptable limits.

In general, the calculation of direct interference between transmitters and receivers, i.e., non-intermodulation interference, is relatively simple and will not be discussed herein in further detail. The computation of intermodulation interference, however, will be described with respect to a typical antenna site containing $\alpha$ number of transmitters and $\beta$ number of receivers, as shown in FIG. 1. In a conventional cosite analysis system, each intermodulation product frequency $F_{INT}$ and each intermodulation product bandwidth $BW_{INT}$ is calculated as follows:

$$F_{INT} = \pm M_1 \times F_{T1} \pm M_2 \times F_{T2} + \ldots \pm M_\alpha \times F_{T\alpha}$$

$$BW_{INT} = M_1 \times BW_{T1} + M_2 \times BW_{T2} + \ldots + M_\alpha \times BW_{T\alpha}$$

where $[M_1, M_2, \ldots, M_\alpha]$ are positive integers.

The order of $F_{INT}$ is $M_1 + M_2 + \ldots + M_\alpha$.

As shown below, each intermodulation product frequency $F_{INT}$ is then compared to the frequency band of each receiver to determine if the intermodulation product falls within the frequency band of any receiver.

$$\text{IF } F_{INT} \pm \left(\frac{BW_{INT}}{2}\right) \text{ falls within } F_R \pm \left(\frac{BW_R}{2}\right),$$

where $F_R \in \{F_{R1}, F_{R1}, \ldots, F_{R\beta}\}$

If an intermodulation product falls within the band of a receiver $RX_\beta$ (the "victim receiver") at frequency $F_{R\beta}$, then the power of the intermodulation product is calculated. As illustrated in FIG. 2, for any pair of transmitters, $TX_1$ and $TX_2$, the power leakage $L_{T2,T1}$ from $TX_2$ to $TX_1$ is calculated as follows:

$$L_{T2,T1} = P_{T2} - C_{T2,T1}$$

where $P_{T2}$ is the power of $TX_2$ and $C_{T2,T1}$ is the coupling loss from $TX_2$ to $TX_1$ at $F_{T2}$.

The power leaking into the target transmitter $TX_1$ from each other transmitter is calculated in a similar fashion. The transmitter with the lowest leakage power $L_{MIN}$ to the target transmitter is used to calculate the intermodulation product power level.

$$L_{MIN} = \min(L_{T2,T1}, \ldots, L_{T\alpha,T1})$$

Referring to FIG. 3, the intermodulation product power level $P_{INTatT1}$ at $TX_1$ is then calculated as follows:

$$P_{INTatT1} = L_{MIN} + \text{ConversionLoss(order)} + FL_{T1}(\text{at}F_{INT})$$

where $TX_1$ is the victim transmitter, i.e., the transmitter in which the mixing is occurring, $L_{MIN}$ is the minimum power leakage as calculated above, ConversionLoss is a lookup table unique to the victim transmitter (discussed in detail below), and FL is the output filter unique to victim transmitter. Order is the order of the intermodulation product under consideration.

The intermodulation product level $P_{INT}$ is then calculated at victim receiver $RX_\beta$ by adding the coupling losses $C_{T1,R\beta}$ between the victim transmitter $TX_1$ and the receiver $RX_\beta$ as follows:

$$P_{INTatRX} = P_{INTatTX} + C_{T1,R\beta}$$

where the coupling losses $C_{T1,R\beta}$ include all losses between the victim transmitter and the victim receiver.

Referring to FIG. 4, the final step in the analysis is to compare the intermodulation product power level $P_{INTatRX}$ at the receiver $R_\beta$ to the susceptibility to interference of the receiver $S_{R\beta}$. If $P_{INTatRX} \leq S_{R\beta}$ then interference occurs.

In prior cosite analysis systems, this process is repeated for each intermodulation product, even for those with power levels below that necessary to cause interference in the most susceptible receiver. Only once the intermodulation product frequencies have been calculated are the power levels calculated for the intermodulation products. Since the actual number of possible intermodulation product frequencies is unlimited, these systems include several provisions to limit computing time to within acceptable limits.

The first provision of those systems is to limit the number of transmitter frequencies mixing together at any given time to a relatively low number, generally two, or at most three. This is because the number of frequency combinations at a complicated site, i.e., a site with many frequencies, increases by approximately the power of the number of frequencies being mixed. For example a site with 100 transmit frequencies will have approximately $100^5 - 100^2 \cong 100^5$ more combinations of 5 frequencies mixing than with combinations of two frequencies mixing. This equates to an increase of $100^5/100^2 = 1,000,000$ times longer in analysis time.

The second provision of those systems is to compute combinations of frequencies only up to a relatively low order, usually $5^{th}$ or $7^{th}$ order. The number of combinations for n orders is roughly $n(n-1) \cong n^2$. So, for example, a system that calculates combinations of frequencies up to 11 orders will have approximately $11^2/5^2 \cong 5$ times more combinations that a system that only calculates 5 combinations.

Because the number of intermodulation products greatly increases as higher orders of intermodulation products are considered and as intermodulation products are calculated for more combinations of transmitters, conventional systems significantly limit each of these parameters with concomitant loss of quality of the analysis. Accordingly, it would be desirable to have a cosite analysis system in which it is possible to limit the number of intermodulation products that are considered by the system, even while higher orders of intermodulation products are considered and as intermodulation products are calculated for more combinations of transmitters, so as to reduce the amount of time required to analyze a site while improving the quality of the resulting analysis.

Another aspect of cosite analysis relates to the physical placement of antennas and other equipment on the tower. Typically, a civil engineer is responsible for the physical layout of the tower, including locating equipment on the tower and preparing drawings of the tower while the above-described type of analysis of possible RF interference is being conducted. If as a result of either the RF analysis or of the physical constraints of the tower it is necessary to move a piece of equipment on the tower, the tower layout and the RF analysis must both be redone. Thus, because the layout and RF aspects of the layout are not integrated, tower design is less efficient. The RF analysis and the tower layout must also be redone if any equipment is added to or removed from the tower.

Accordingly, it would be desirable to have an antenna cosite analysis system that is integrated with a tower layout system so as to enable more efficient design of antenna towers.

SUMMARY OF THE INVENTION

An invention that meets those needs and has other features and advantages that will be apparent to one skilled in the art has now been developed. Broadly, in one aspect the present invention relates to an antenna cosite analysis system which includes:

means for interactively designing an antenna tower for placement of one or more antennas on the tower;

means for interactively designing wireless communication circuits;

means for interactively relating the antennas on the tower to the wireless communication circuits; and RF analysis means for simulating the wireless communication circuits with their related antennas and for generating reports on the possible interference between the wireless communication circuits.

The means for interactively designing an antenna tower preferably includes means for placement of antenna mounts on the tower and means for interactively defining the structure of the tower. A component database includes descriptions of wireless communication components such as transmitters, receivers, combiners, splitters, isolators, filters, power amplifiers, low-noise amplifiers, directional couplers, antennas, and cables. The component database also includes descriptions of available antenna mounts.

The means for interactively designing an antenna tower enables the interactive selection of antennas and mounts from the component database, and the placement of the antennas and mounts on the tower. The means for interactively designing wireless communication circuits includes a block diagram editor for designing the wireless communication circuits. The block diagram editor enables the user to interactively select wireless communication components from the component database for inclusion in the communication circuits.

The invention also relates to a process for determining intermodulation interference between two or more transmitters and one or more receivers. The process comprises the steps of:

a) at each transmitter, determining a minimum susceptibility to interference of the receivers;

b) separately considering each transmitter as a victim transmitter paired with each other transmitter, and for each such other transmitter-victim transmitter pair, determining a highest order intermodulation product generated as a result of interference between the victim transmitter and the other transmitter with a power level sufficient to exceed the minimum susceptibility of the one or more receivers at the victim transmitter, and storing the highest order intermodulation product for each other transmitter-victim transmitter pair; and c) separately considering each transmitter as a victim transmitter, and for each victim transmitter determining the intermodulation products generated as a result of interference between the victim transmitter and all of the at least one other transmitters each other transmitter having a leakage power to the victim transmitter, the one of the at least one other transmitters having the lowest leakage power to the victim transmitter being the minimum leakage transmitter for that victim transmitter, the minimum leakage transmitter and the victim transmitter together constituting a minimum leakage transmitter-victim transmitter pair, the intermodulation products for each victim transmitter being determined in this step up to the highest order intermodulation product determined in step (b) for the other transmitter-victim transmitter pair that is the same as the minimum leakage transmitter-victim transmitter pair.

To determine the minimum susceptibility to interference of the one or more receivers at each transmitter the system determines the susceptibility of each receiver at the victim transmitter and then determines the minimum of the susceptibilities of the one or more receivers.

To determine the susceptibility of each receiver at the victim transmitter the system subtracts the coupling loss between the receiver and the victim transmitter from the susceptibility to interference of the receiver at the receiver. The coupling loss between the receiver and the victim transmitter is determined by summing the coupling losses, at the frequency of the receiver, between the receiver and the receiver antenna, between the receiver antenna and the victim transmitter antenna, and between the victim transmitter antenna and the victim transmitter.

Determining the susceptibility of the receiver involves determining the noise level at the receiver by subtracting the carrier-to-noise ratio of the receiver from a usable sensitivity of the receiver, and then subtracting 6 dB from the noise level at the receiver. The step of determining the highest order intermodulation product preferably includes the steps of:

for each individual transmitter at each order, determining the power level $P_{INTatTX}$ for such transmitter as sum of the power leakage $L_{T2,T1}$ between such transmitter and the victim transmitter and the conversion loss for the victim transmitter at such order; and comparing the power level $P_{INTatTX}$ to the minimum susceptibility at the victim transmitter.

For each victim transmitter, the system determines the transmitter with the lowest leakage power $L_{MIN}$ to the victim transmitter. For each intermodulation product up to the highest order intermodulation product of the minimum leakage transmitter-victim transmitter pair, the system determines an intermodulation product frequency $F_{INT}$ and an intermodulation product bandwidth $BW_{INT}$ as follows:

$$F_{INT} = \pm M_1 \times F_{T1} \pm M_2 \times F_{T2} + \ldots \pm M_\alpha \times F_{T\alpha}$$

$$BW_{INT} = M_1 \times BW_{T1} + M_2 \times BW_{T2} + \ldots + M_\alpha \times BW_{T\alpha}$$

where $[M_1, M_2, \ldots, M_\alpha]$ are positive integers.

After determining the intermodulation product frequency $F_{INT}$ and intermodulation product bandwidth $BW_{INT}$, the system compares each intermodulation product frequency to the frequency band of each receiver to determine if the intermodulation product falls within the frequency band of any receiver. The system identifies interfering intermodulation products, which are intermodulation products with a frequency falling within the band of one of the receivers and determines the power of the each interfering intermodulation product at the victim transmitter $P_{INTatTX}$ as follows:

$$P_{INTatTX} = L_{MIN} + \text{ConversionLoss(order)}$$

where $L_{MIN}$ is the minimum leakage power of the interfering transmitters at the victim transmitter.

For each interfering intermodulation product, the system then determines the intermodulation product power level $P_{INTatRX}$ at victim receiver $RX_{62}$ by summing the losses in the coupling $C_{T1,R\beta}$ between the victim transmitter and the victim receiver $RX_\beta$:

$$P_{INTatRX} = P_{INTatTX} + C_{T1,R\beta}.$$

If the intermodulation product power level $P_{INTatRX}$ at receiver $R_\beta$ is greater than the susceptibility of the victim receiver $S_{R\beta}$, then interference is caused at the receiver.

The invention also relates to a process for determining intermodulation interference in a receiver between two or more transmitters and the receiver. The process comprises the steps of:

a) determining a minimum susceptibility to interference of the receiver;

b) for each transmitter, determining a highest order intermodulation product generated as a result of interference between the transmitter and the receiver with a power level sufficient to exceed the minimum susceptibility of the receiver, and storing the highest order intermodulation product for each transmitter; and c) separately considering each transmitter as a victim transmitter, and for each victim transmitter determining the intermodulation products generated in the receiver as a result of interference between the victim transmitter and all of the at least one other transmitters each at least one other transmitter having a leakage power to the victim transmitter, the one of the other transmitters having the lowest leakage power to the receiver being the minimum leakage transmitter, the intermodulation products being determined in this step up to the highest order intermodulation product of the minimum leakage transmitter determined in step (b)

Also disclosed is an apparatus for determining intermodulation interference between two or more transmitters and one or more receivers. The apparatus comprises:

means for determining a minimum susceptibility to interference of the one or more receivers at each transmitter;

means for separately considering each transmitter as a victim transmitter and for determining and storing a highest order intermodulation product generated as a result of interference between the victim transmitter and each other transmitter individually with a power level sufficient to exceed the minimum susceptibility at the victim transmitter; and means for separately considering each transmitter as a victim transmitter and for determining the intermodulation products generated as a result of interference between the victim transmitter and all of the at least one other transmitters each other transmitter having a leakage power to the victim transmitter, the one of the at least one other transmitters with the lowest leakage power to the victim transmitter being the minimum leakage transmitter, the intermodulation products being determined up to the highest order intermodulation product stored for the minimum leakage transmitter and victim transmitter.

Finally, the invention relates to an apparatus for determining intermodulation interference in a receiver between at least two transmitters and the receiver. The apparatus comprises:

means for determining a minimum susceptibility to interference of the receiver;

means for determining and storing, for each transmitter, a highest order intermodulation product generated as a result of interference between the transmitter and the receiver with a power level sufficient to exceed the minimum susceptibility of the receiver; and means for separately considering each transmitter as a victim transmitter and for determining the intermodulation products generated in the receiver as a result of interference between the victim transmitter and all of the at least one other transmitter, each other transmitter having a leakage power to the victim transmitter, the one of the at least one other transmitters having the lowest leakage power to the receiver being the minimum leakage transmitter, the intermodulation products being determined up to the highest order intermodulation product of the minimum leakage transmitter.

BRIEF DESCRIPTION OF THE DRAWINGS

To facilitate further discussion of the invention, the following drawings are provided in which:

FIGS. 5–7 show screen displays for defining communication components used in the system of the invention.

FIGS. 10–19 show screen displays used for defining towers and for positioning mounts and antennas on the towers.

FIG. 25 shows several screen displays of the report generating module of the invention.

These drawings are for illustrative purposes only and should not be used to unduly limit the scope of the invention.

DETAILED DESCRIPTION OF THE INVENTION

The present invention is an analysis system for collocated wireless communication systems. The system includes an antenna tower design system that is integrated with an RF analysis system. The system is operable on an IBM™ PC compatible computer operating Microsoft Windows 95™ and is implemented in Borland Delphi™. Storage of the component definitions and various lookup tables that are discussed below is by means of an Interbase™ database. It is foreseen that the system of the invention may be implemented on any appropriate computer system, and the preferred implementation is not intended to limit the scope of the invention.

One module of the system facilitates the interactive design of communication circuits and the placement of antennas on towers. A second module of the system analyzes the interaction between the communication circuits and generates reports on any interference between the circuits.

In general, the electrical components used in designing communication circuits include transmitters, receivers, combiners, splitters, isolators, filters, power amplifiers, low-noise amplifiers, directional couplers, antennas, and the cables that extend between these components. Each model of each type of component may vary from other models of the same component. A database stores descriptive information about each component that may be used in the design and analysis of communication circuits in accordance with the invention. The descriptive data in the database for any individual component may be provided by the component manufacturer or may be determined through experimental testing.

Figure 1:
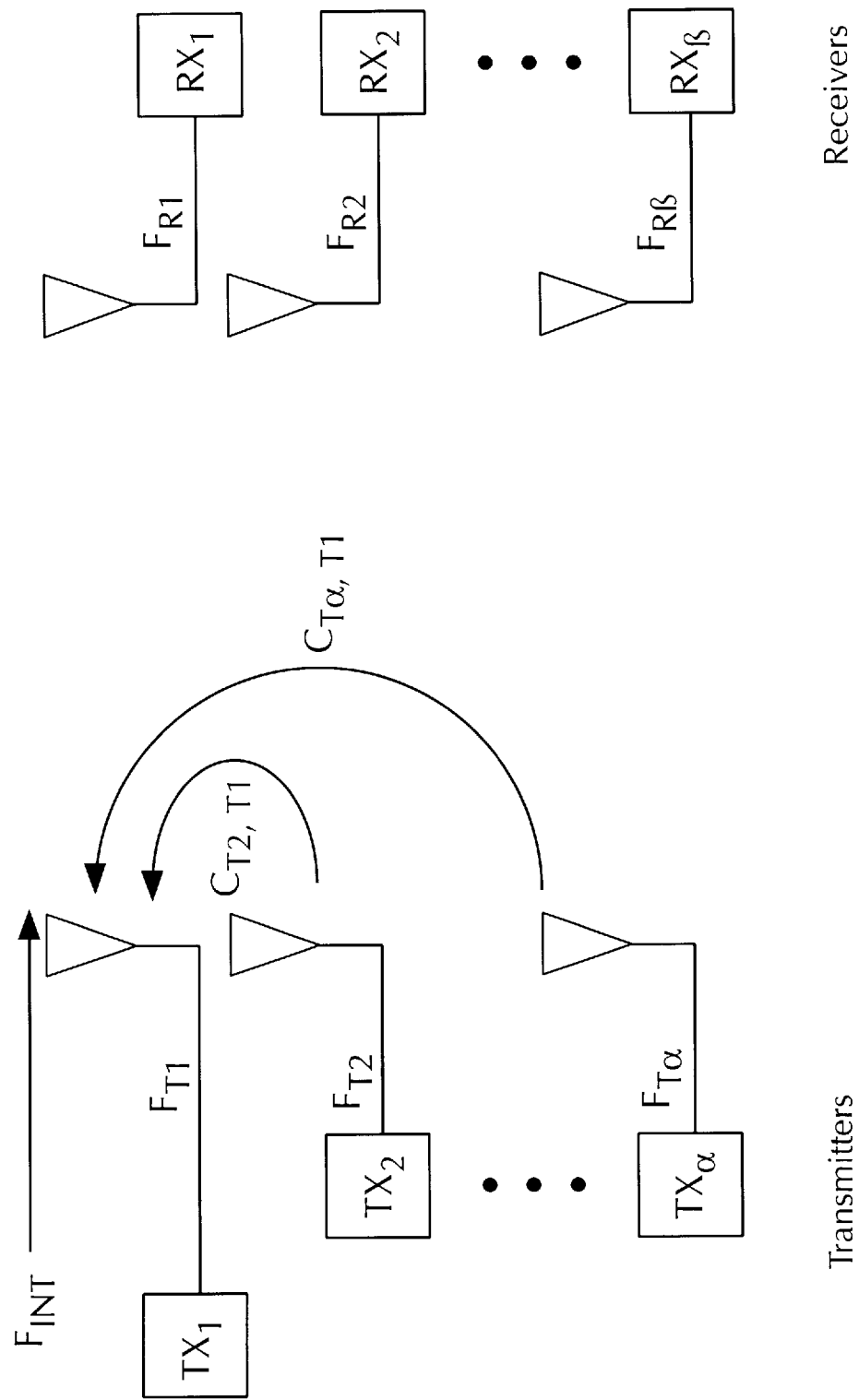
FIGS. 1–4 are block diagrams showing the relationship between the transmitters and receivers in a wireless communication system.
Figure 2:
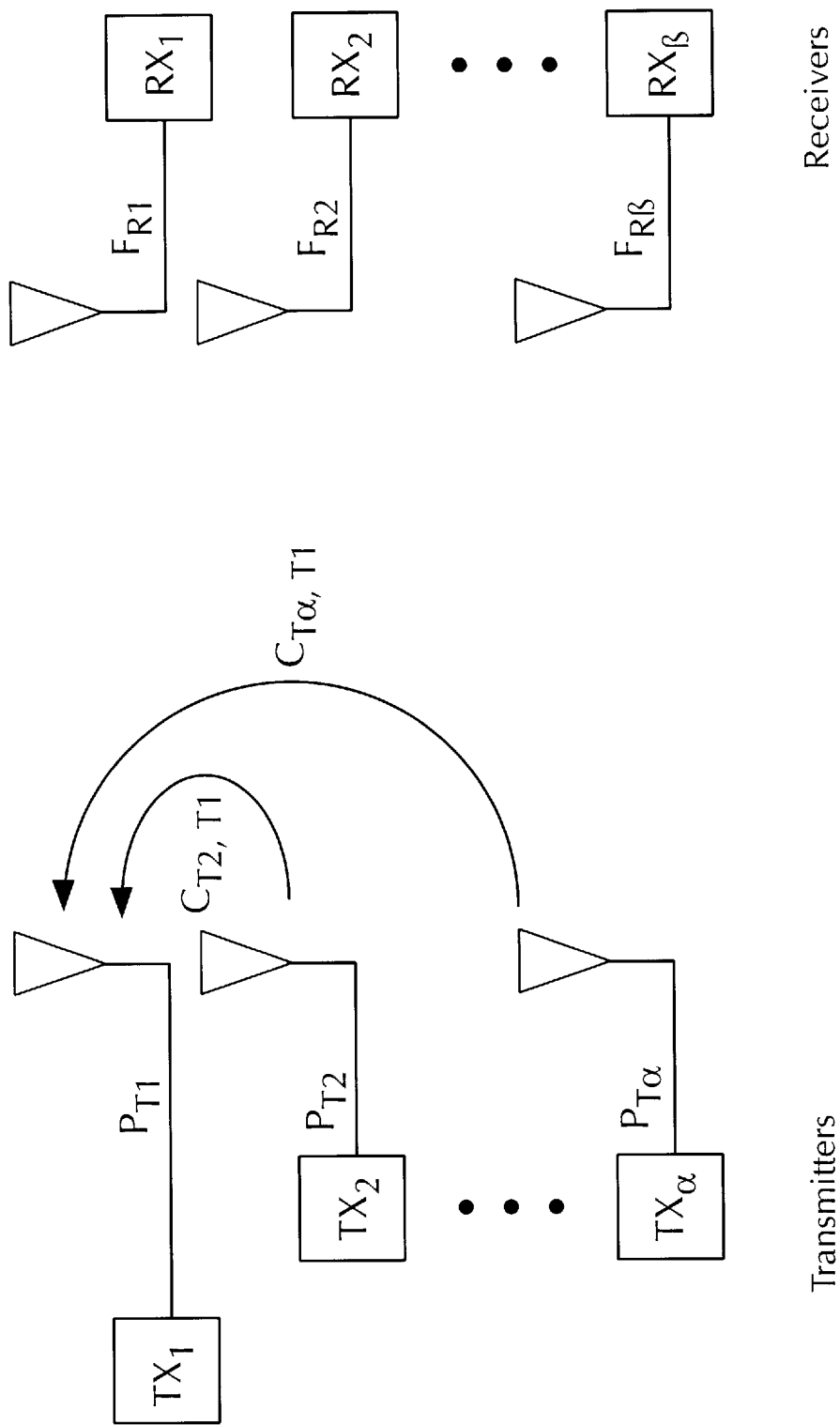
Figure 3:
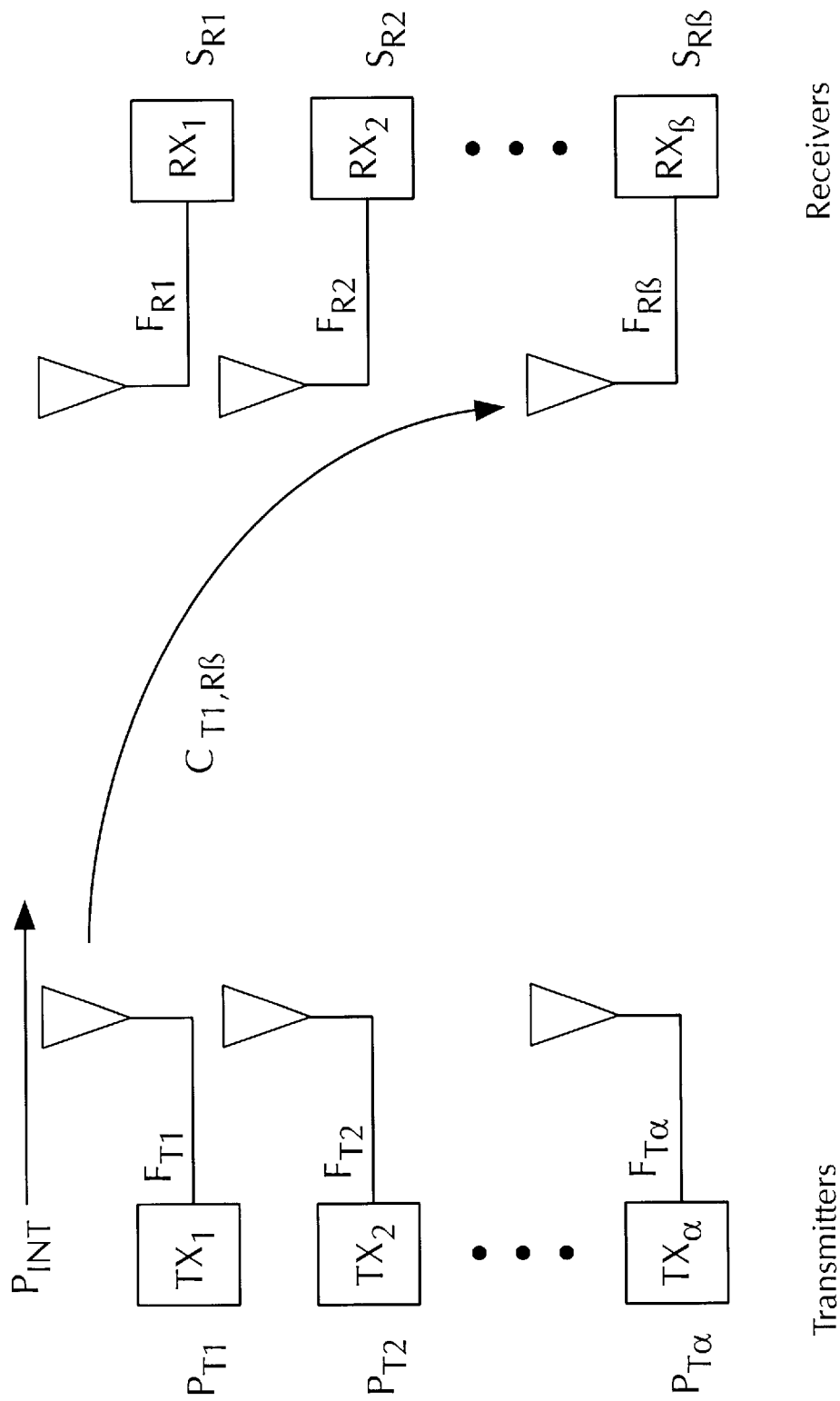
Figure 4:
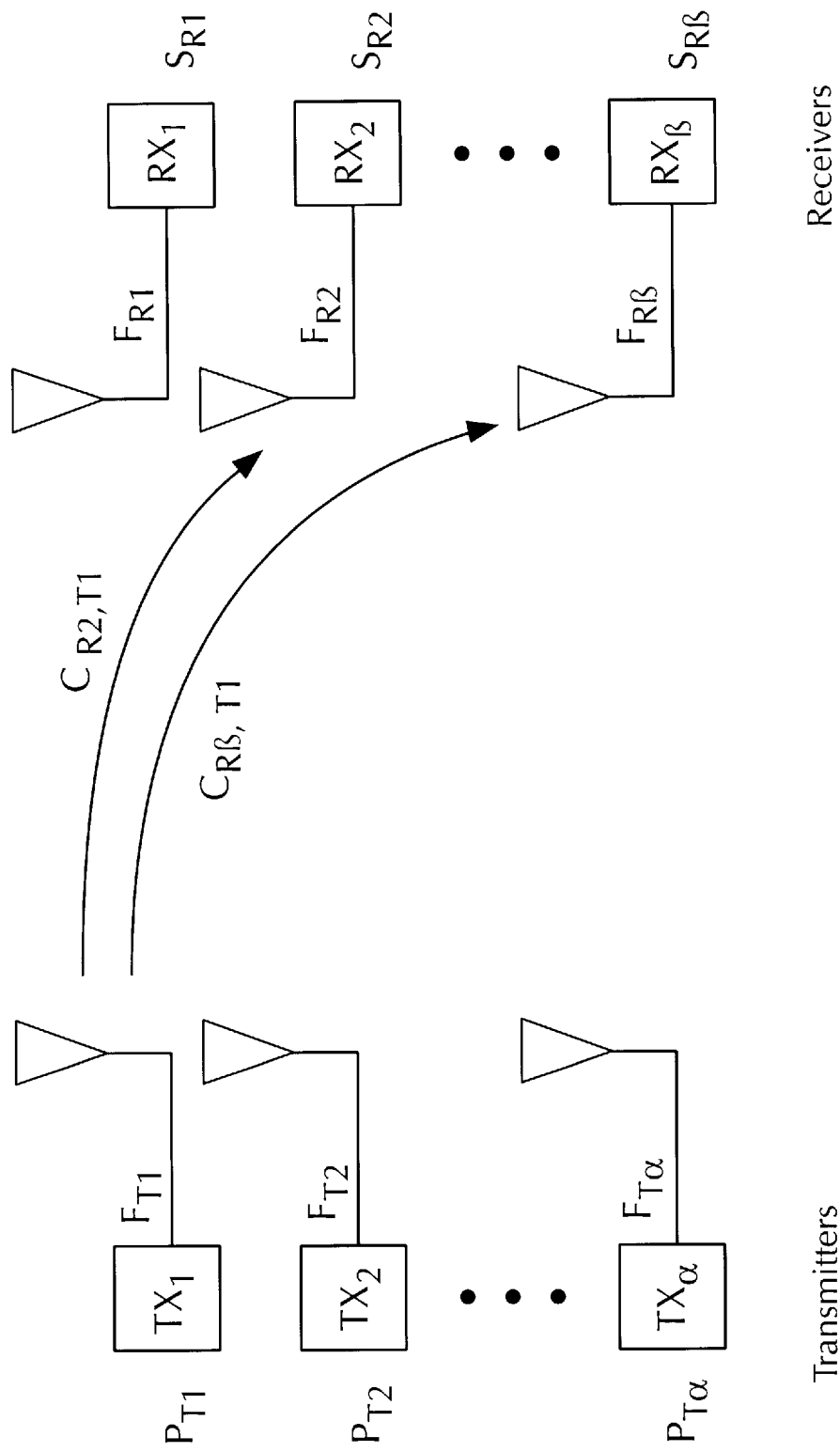
Figure 5:
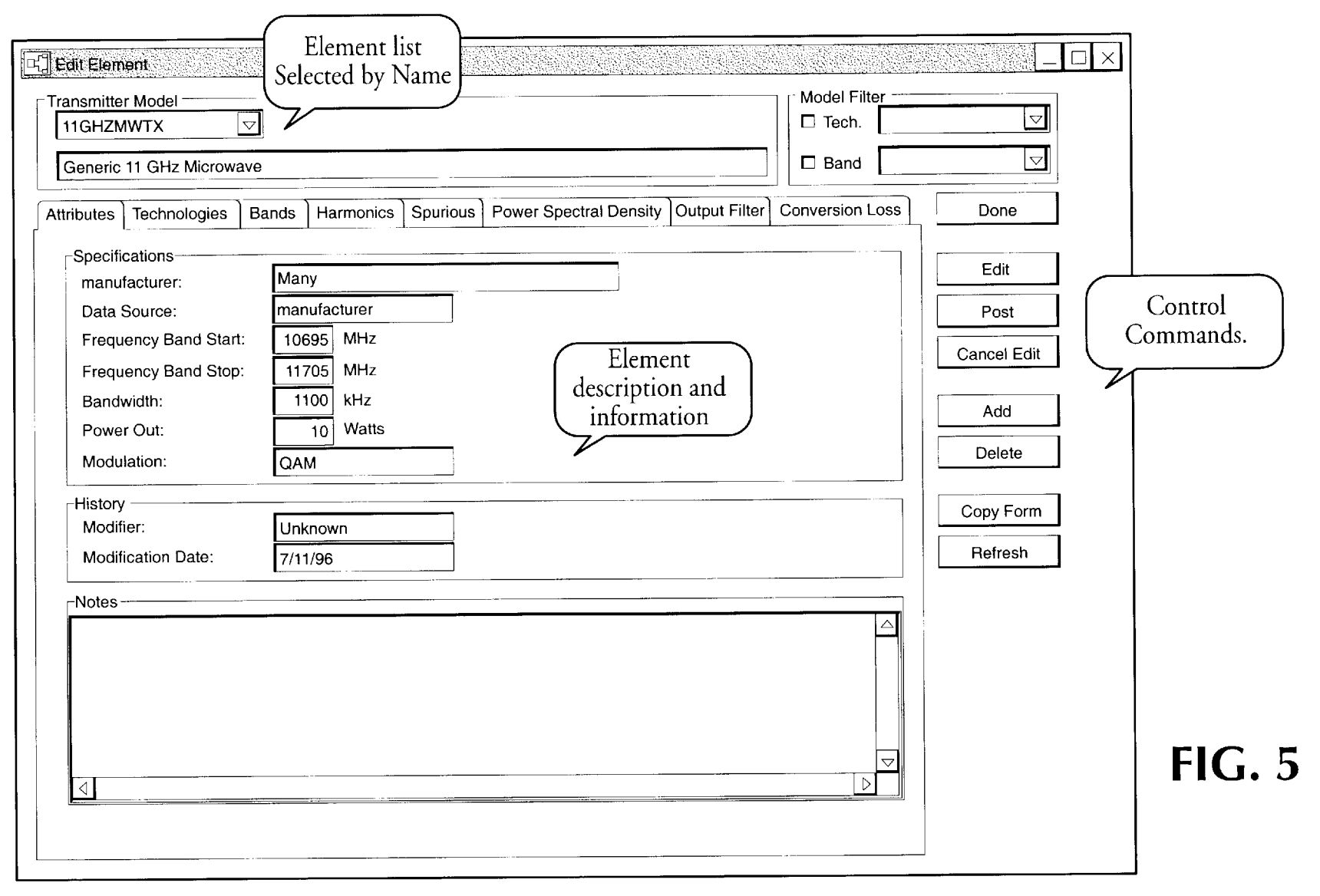
Figure 6:
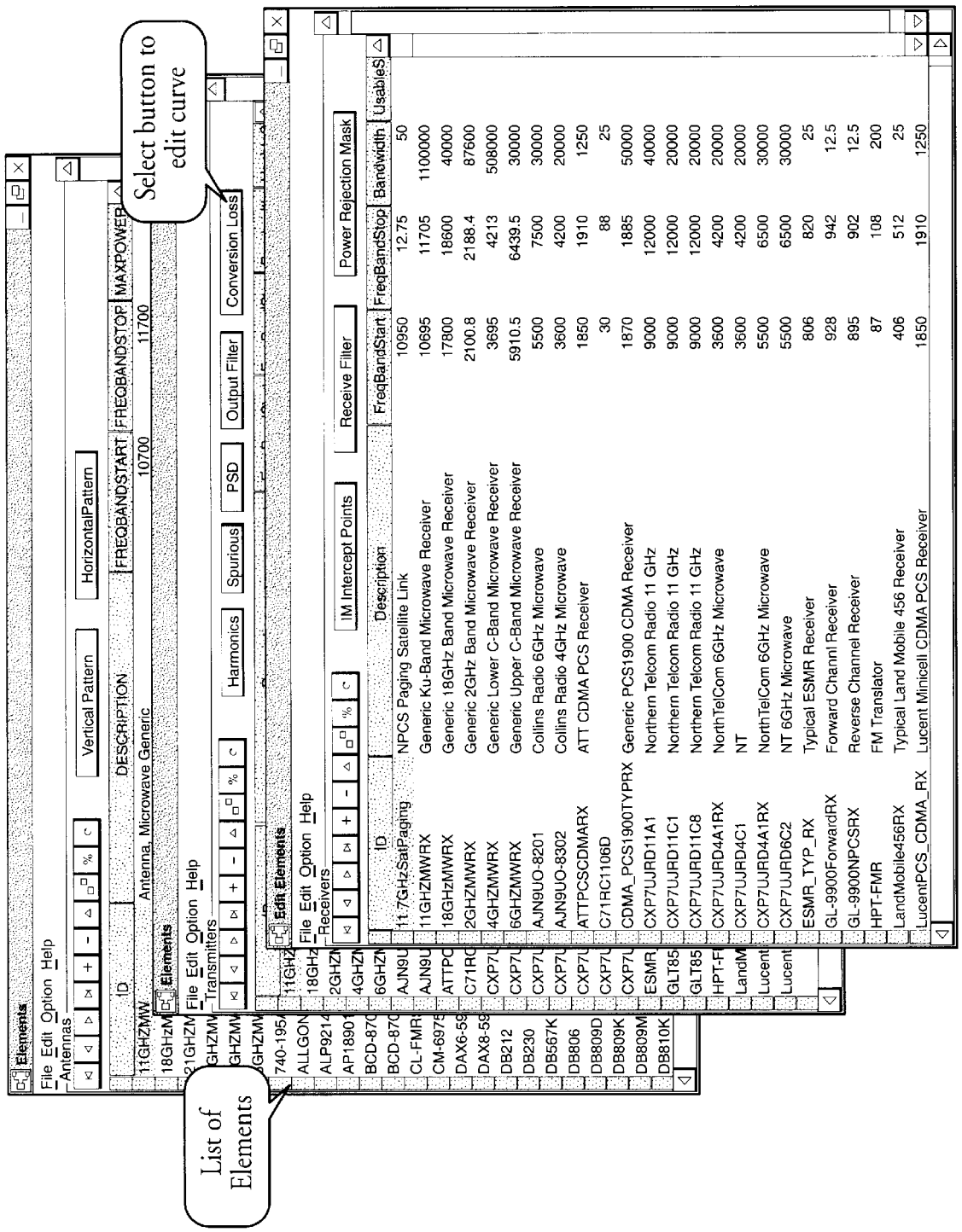

As shown in FIGS. 5 and 6, the system includes data entry windows that allow the characteristics of each component to be entered, displayed, and edited. In order to edit a definition, the component to be edited is selected from a list of components and edited using conventional data entry screens. New components may be added in a similar fashion using the data entry screens. The resultant component data is stored in the Interbase™ database.

In a preferred embodiment, there are several definitions that are common to all of the different types of components. These common definitions include:

1. Frequency Band—A list of frequency bands in which the component is designed to operate. This parameter enables components that operate in particular frequency bands to be quickly identified.

2. Technology—List of technology types for which the component can be used, e.g., AMPS, CDMA, TDMA, and paging.

3. Manufacturer—Name of manufacturer.

4. Data Source—Source of information on the component, e.g., catalog, cut sheet, measurement, etc.

5. Frequency Band Start—Lowest frequency at which component is considered operational.

6. Frequency Band Stop—Highest frequency at which component is considered operational.

7. Last Edited By—Name of person who last modified the data for the component.

8. Last Edit Date—The date on which the component data was last modified.

9. Notes—This field lists any additional useful information about the component.

In addition to the common definitions, the following parameters may be entered for select types of components:

Transmitters

1. Frequency Plan—The frequency plan provides a list of center frequencies at which the transmitter is tuned and tested.

2. Bandwidth—Lists the bandwidth of the transmitter in kHz, centered on each of the frequencies indicated in the Frequency Plan.

3. Power Out—The output power, in Watts, of the transmitter in its bandwidth. This parameter is also known as "carrier power out."

4. Modulation—The type of modulation used by the transmitter.

5. Harmonics—A table of values in dBc (relative to carrier power out) for the first 11 harmonics of the center frequency. Additional harmonics may be added, if desired.

6. Spurious—A table of values in dBc for any transmitter outputs that do not fall at the harmonics of the carrier. These are usually caused by some intermediate frequency (IF) used in the process of changing the signal from an audio frequency signal to an RF frequency signal.

7. Power Spectral Density—A curve (stored as a series of data points) of noise values in dBc per Hz relative to the carrier frequency. These values are used in calculating transmitter noise.

8. Output Filter—This is a curve of frequency vs. the loss that interfering signals coming into the transmitter and intermodulation products going out of the transmitter pass through before the conversion loss.

9. Conversion Loss—Table of values used to calculate losses for different intermodulation product orders (discussed in more detail below). Also known as turn-around loss.

Power Amplifiers

1. Bandwidth—Bandwidth, in kHz, over which the amplifier is rated to operate.

2. Power Out—Total output power, in Watts, that can be achieved by the amplifier.

3. Gain—Gain in dB.

4. Harmonics—A table of values in dBc (relative to carrier power out) for the first 11 harmonics of each frequency being amplified.

5. Spurious—A table of values in dBc listing any outputs that do not fall at the harmonics of the carrier.

6. Power Spectral Density—A curve of noise values in dBm per Hz relative to the usable band. These values are used in calculating transmitter noise.

7. Output Filter—This is a curve of frequency vs. the loss that interfering signals coming into the output of the amplifier and intermodulation products going out of the power amplifier pass through before the conversion loss.

8. Conversion Loss—Table of values used to calculate losses for different intermodulation orders.

9. Internal Intercept Points—Used to calculate the intermodulation products generated at the input of the amplifier that pass through the amplifier.

Receivers

1. Frequency List—List of frequencies used by receiver.
2. Bandwidth—Bandwidth occupied by the receiver.
3. Usable Sensitivity—Receiver required minimum power level for some standardized quality tests.
4. Modulation—Type of modulation used by receiver to recover signal.
5. Carrier to Noise Ratio (C/N)—Relationship between Usable Sensitivity and Noise in the receiver's bandwidth.
6. Intermodulation Intercept Points—Table of values used to calculate the intermodulation products generated internal to the receiver.
7. Receiver Filter—Curve used to characterize the receiver's response to external interference at different frequencies.
8. Power Rejection Mask—Curve in dBm vs. frequency showing the level of signal outside of the receiver's band that would cause the receiver to lose sensitivity. Used in receiver desensitivity testing.

Low Noise Amplifiers (LNA)

1. Bandwidth—Bandwidth, in kHz, over which the LNA is rated to operate.
2. Power Out—Total output power, in Watts, that can be reached by the amplifier.
3. Gain—Gain relationship between the power entering the amplifier and the power exiting the amplifier.
4. Noise Figure—The ratio of the signal-to-noise ratio of the input signal to the signal-to-noise ratio of the output signal.
5. Intercept Points—Table of values used to calculate the intermodulation products generated in the amplifier.
6. Output Filter—Curve used to characterize the amplifier's response to external interference at different frequencies.
7. Power Rejection Mask—Curve in dBm vs. frequency showing the level of signal out of the amplifier's band that would cause the amplifier to lose sensitivity. Used in receiver desensitivity testing.

Antennas

1. Maximum Input Power—Power limit for the sum of all transmitters attached to the antenna.
2. Gain—Maximum gain relative to an isotropic antenna in the main beam of the antenna.
3. Beamwidth—Vertical angle of main beam where signal is within 3 dB of maximum gain.
4. Tilt—Tilt of vertical antenna pattern relative to the horizon.
5. Antenna Base Height—Length of base of antenna that is not active electrically. Used to attached antenna to mount.
6. Antenna Base Width—Width of base of antenna that is not active electrically. Used to attach antenna to mount.
7. Element Length—Length of active portion of antenna.
8. Antenna Type—Dish, horn, panel, yagi, etc.
9. Horizontal Pattern—Antenna pattern over 360 degrees in the horizontal plane.
10. Vertical Pattern—Antenna pattern over 360 degrees in vertical plane.

Combiners And Splitters

1. Maximum Input Power—Maximum power that can be input to component.
2. Number of Inputs/Outputs—Combiners and splitters can combine or split 2 to 50 signals.
3. Input-Output Loss—Curve showing signal loss vs. frequency for signals passing from the input to the output.
4. Output-Input Loss—Curve showing signal loss vs. frequency for signals passing from the output to the input.
5. Input-Input Loss—Curve showing signal loss vs. frequency for signals passing from the input to another input.

Isolators

1. Maximum Input Power—Maximum power that can be input to isolator.
2. Input-Output Loss—Curve showing signal loss vs. frequency for signals passing from the input to the output.
3. Output-Input Loss—Curve showing signal loss vs. frequency for signals passing from the output to the input.

Filters

1. Maximum Input Power—Maximum power that can be input to filter.
2. Insertion Loss—Curve showing signal loss vs. frequency for signals passing from input to output or output to input.

Cable

1. Loss Per Length—Shows signal loss per 100 ft. vs. frequency for signals passing from input to output or output to input.

Directional Couplers

1. Maximum Input Power—Maximum power that can be input to coupler.
2. Transfer Function—Curve showing signal loss vs. frequency for signals passing from input to output or output to input.
3. Coupled Input—Curve showing signal loss vs. frequency for signals passing from input to coupled input port.
4. Coupled Output—Curve showing signal loss vs. frequency for signals passing from output to coupled output port.

Figure 7:
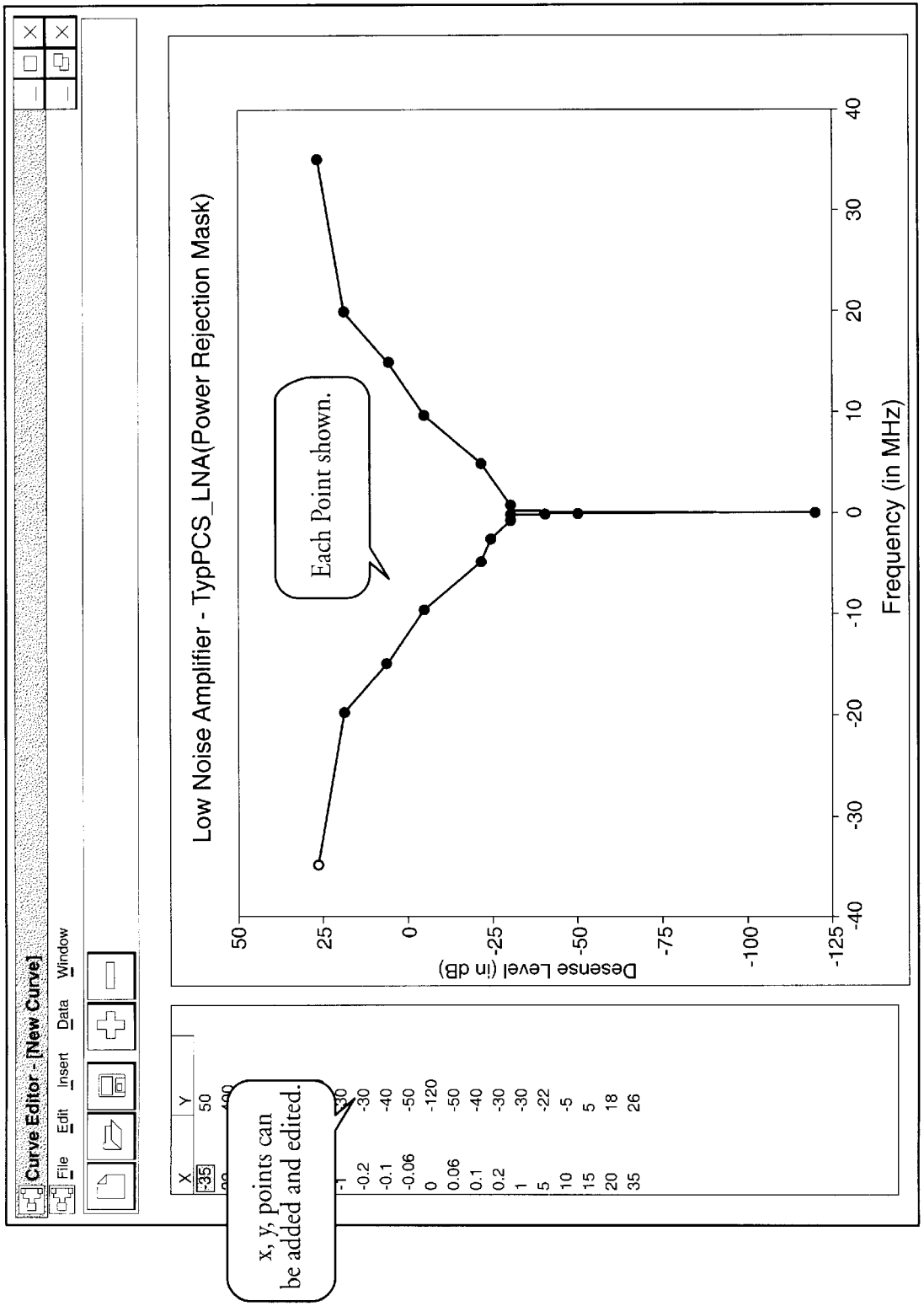

As shown in FIG. 7, the curves for the various components may be displayed and edited using curve editor data screens. The X and Y points of the curve can be added or edited and the resultant curve redisplayed. All values can be stored relative to a center frequency.

Figure 8:
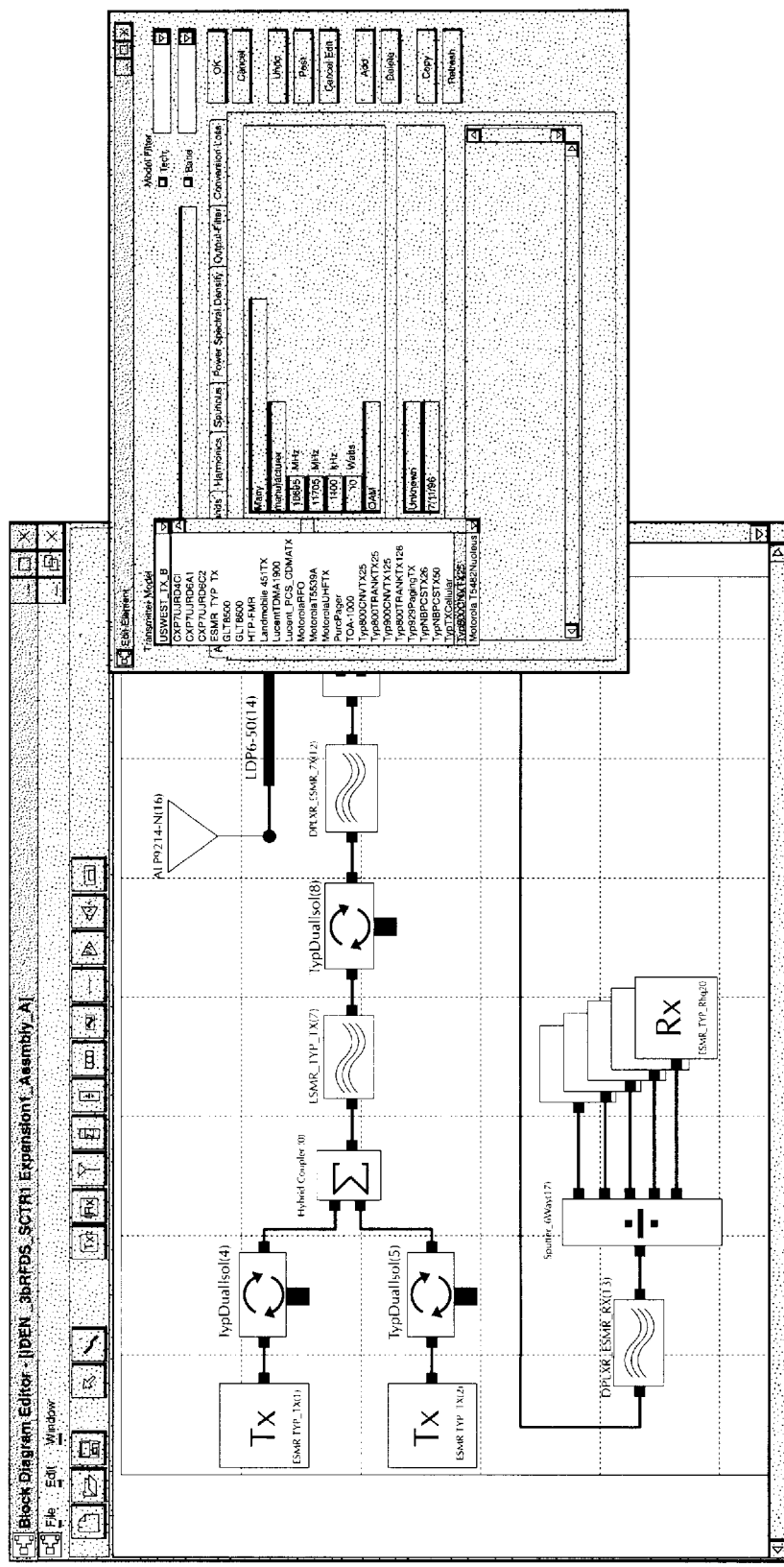
FIG. 8 shows several screen displays for defining individual communication circuits.
Figure 9:
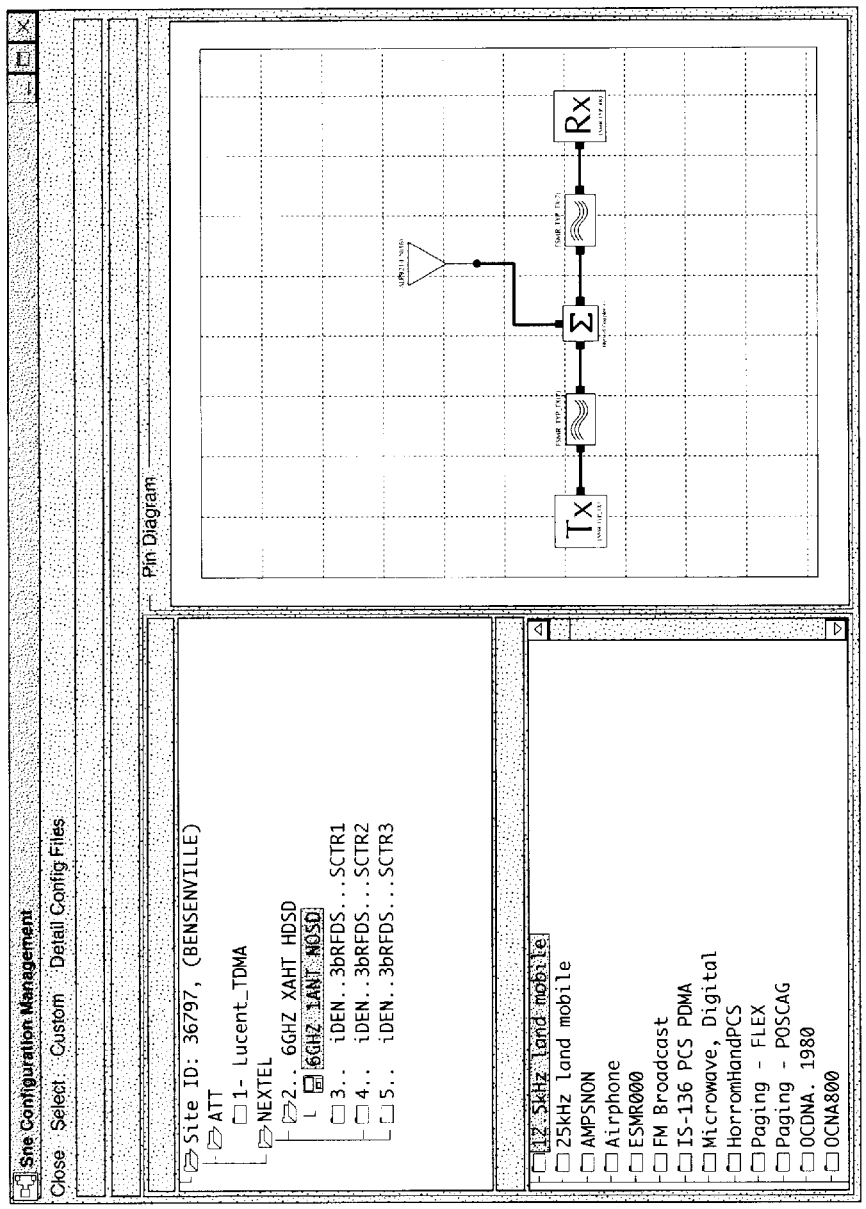
FIG. 9 shows a screen display containing site configurations, circuit configurations, and a block diagram of an individual circuit.

Using the database of available components, the system enables the user to graphically define the circuit configurations at a site. As shown in FIG. 8, a circuit is created by drawing its diagram and by selecting the actual equipment corresponding to each element in the diagram from the component database. Using the menu bar located on top of the screen, the user may select transmitters, receivers, combiners, splitters, isolators, filters, power amplifiers, low-noise amplifiers, directional couplers, and cables, and graphically place these elements on the screen to define the different circuits at a site. After selecting a component, e.g., a transmitter, the user is provided with a list of such components from the component database. This process is repeated until all circuits at the site have been defined. The circuit configurations may be edited at any time if it is necessary to change a configuration for any reason, e.g., to add or delete circuits, or to add additional filtering elements if during RF analysis (discussed below) it is determined that there is excessive interference at the site. As shown in FIG. 9, circuits configurations may be grouped together by client, e.g., AT&T™, Nextel™, etc., and by site.

In addition to defining circuit configurations at a site, the system of the invention may be used to design tower structures as well. The tower structures consist of the towers themselves, and mounts and antennas located on the towers. The data on the tower structures is stored in a shared database with the circuit configurations so that the details of the tower configuration may be considered by the system during RF analysis of the electrical circuits. For example, the distance between the antennas on the tower and the orientation of each antenna are pertinent to the RF analysis. Using the system, RF interference analysis may be conducted interactively as new customers/equipment are added or modified on a tower. If the civil engineers modify the tower structure data, a flag may be set to inform the RF engineers of the change so that the RF interference analysis will be rerun.

Figure 10:
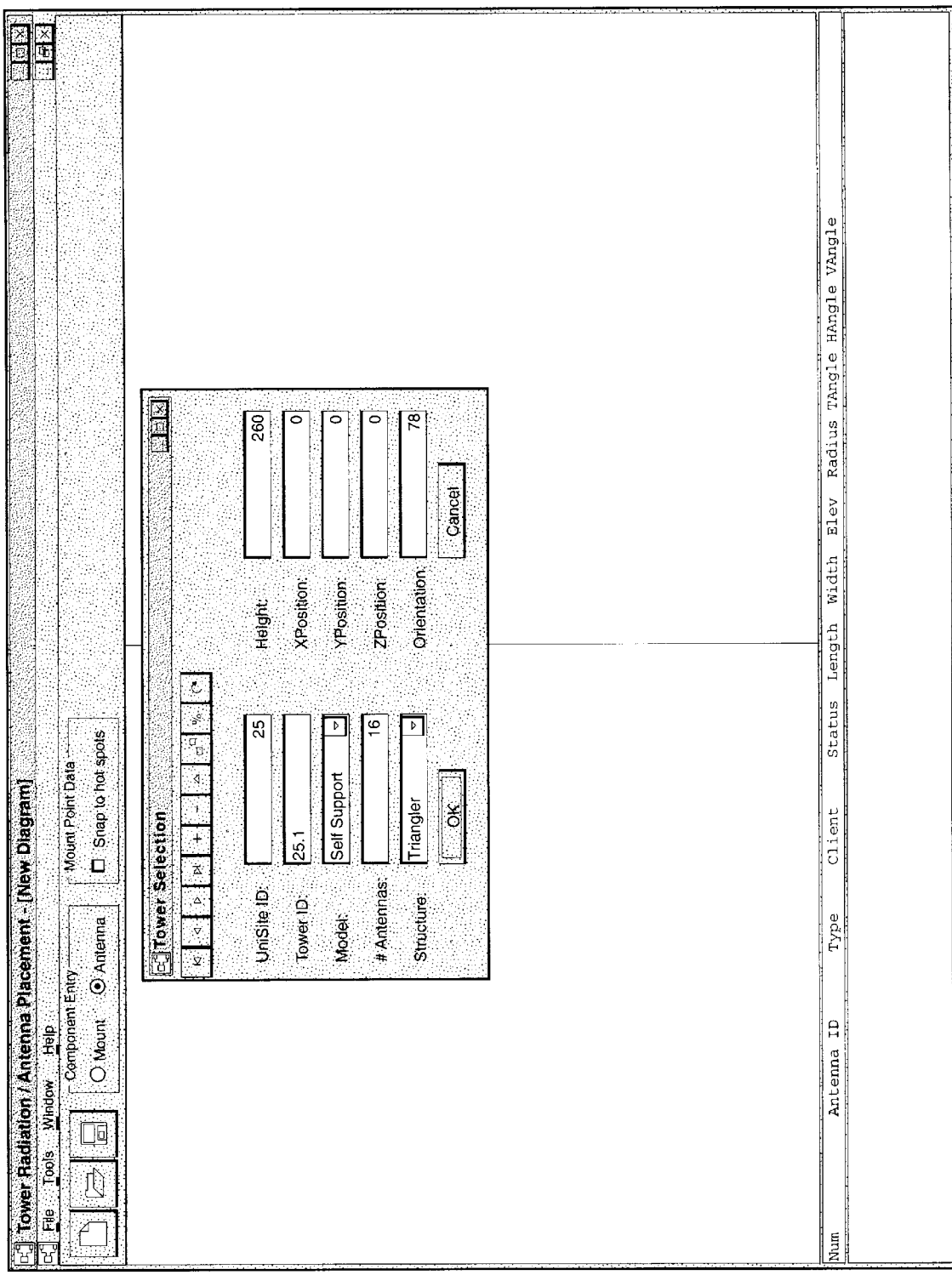

As shown in FIG. 10, a data entry screen is provided to enable the user to select from existing tower definitions in the database or to create a new one. The tower definition information preferably includes:

Site ID: ID No. for site.

Tower ID: Unique tower ID for multiple towers at one site location.

Model: Model type of tower, e.g., self support, pole, guyed.

Antennas: Automatically generated by the number of antennas placed on tower.

Structure: Structure type of tower, e.g., triangle or square.

Height: Height of tower.

X Position: X offset from latitude and longitude of site location.

Y Position: Y offset from latitude and longitude of site location.

Z Position: Z offset from elevation of site location.

Orientation: Angle from due North of one leg of tower.

Figure 11:
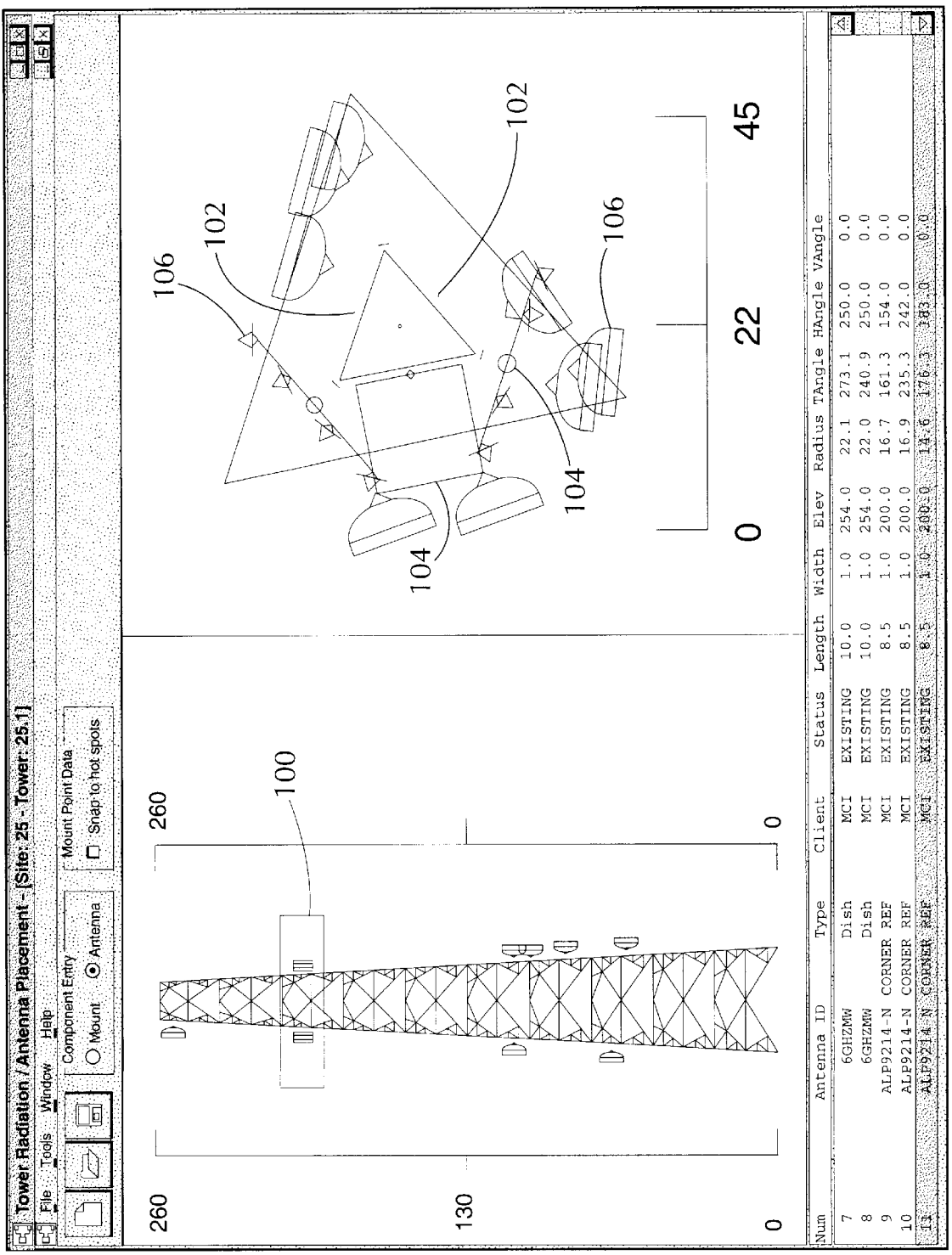

As shown in FIG. 11, when a user opens the file for an existing tower, a side view display, a top view display and an antenna list box appear on the screen. The side view on the left side of the screen contains a scaled tower representation with the antennas on the tower located at actual height and on either side depending upon the actual angle of the antenna referenced from due north. Antennas positioned from 0–180 degrees are shown on the right side, and antennas positioned from 180–360 degrees are shown on the left side. A tower height legend is shown to the left of the tower. The top view on the right side of the screen shows a representation of the tower with all of the antennas on the tower located at their actual positions around the tower.

Figure 12:
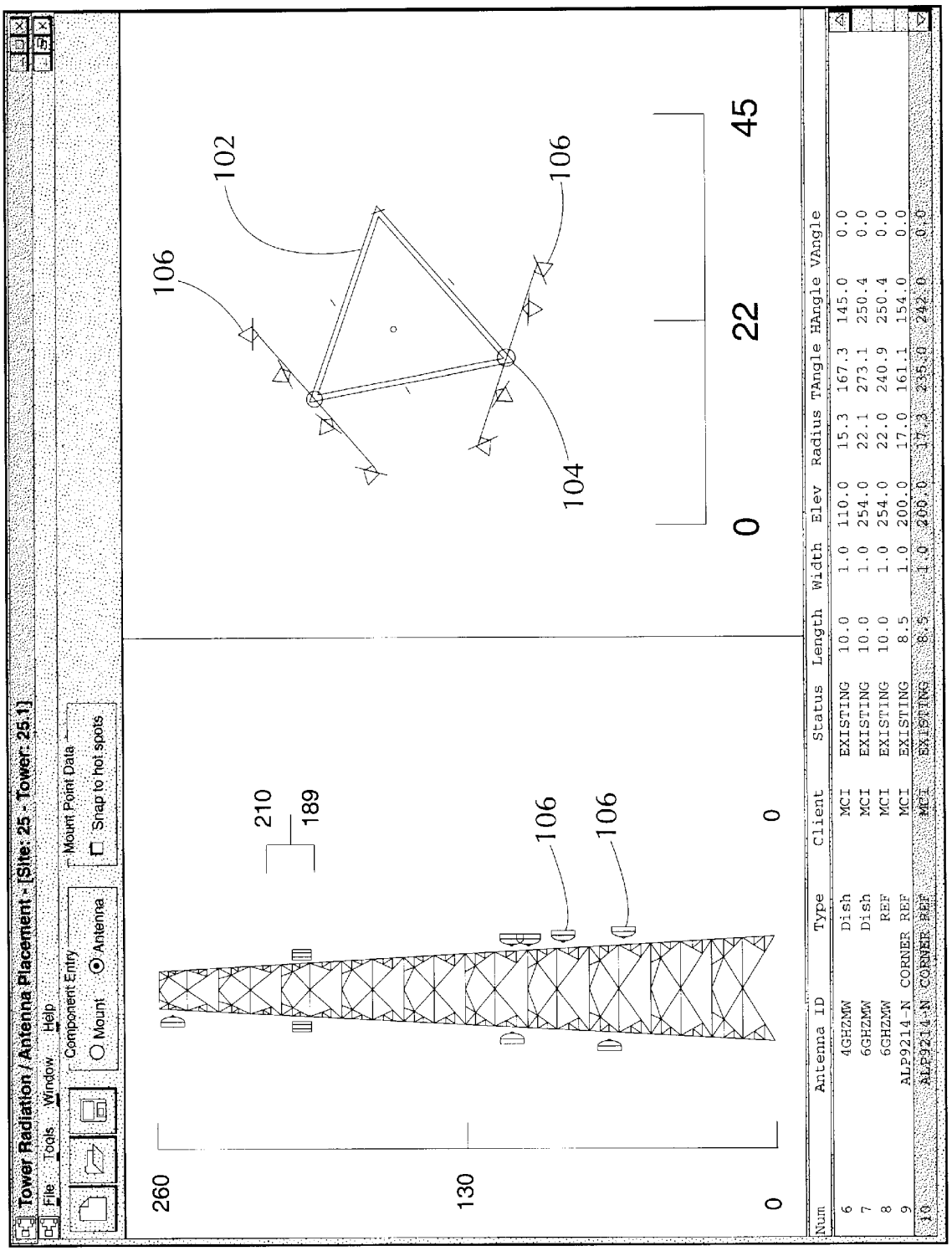

In order to zoom into a particular area of the tower, a top view zoom selection box 100 can be used to select the desired top view display area. The top view for the cross-sectional area selected by selection box 100 in FIG. 11 is shown on the right side in FIG. 12. This top view contains a scaled representation of the selected display area with the top and bottom tower widths for the selected section shown and with all of the antennas in the selection section shown The grid dots 102 shown indicate locations at which a mount may be attached. If the "Snap to Hot Spots" entry is selected on the top of the screen, new mounts will automatically be placed on the nearest grid dot 102. Several types of mounts 104 are also shown with antennas 106. Below the top view display is a legend showing the section width of the tower in feet.

Figure 13:
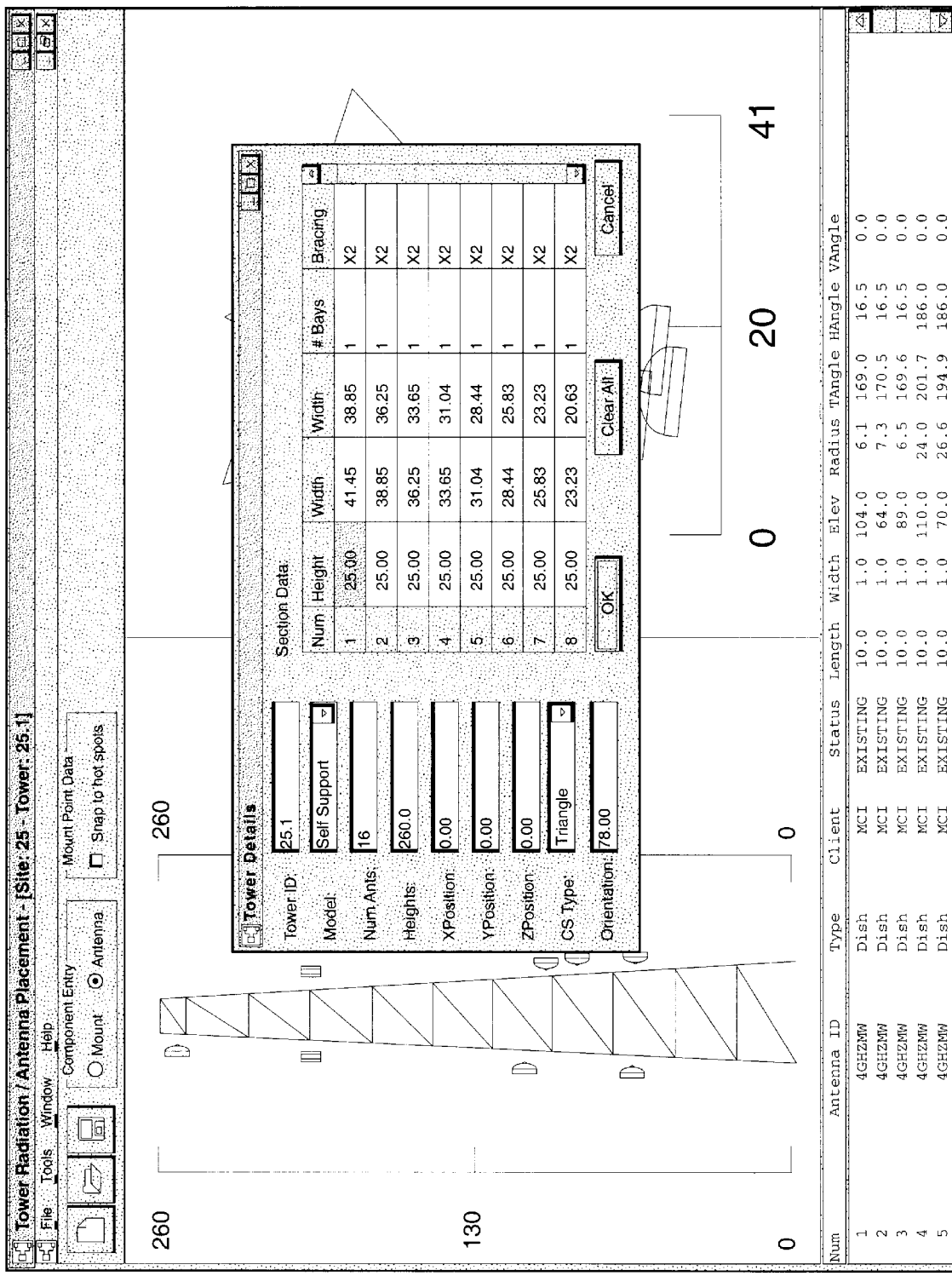
Figure 14:
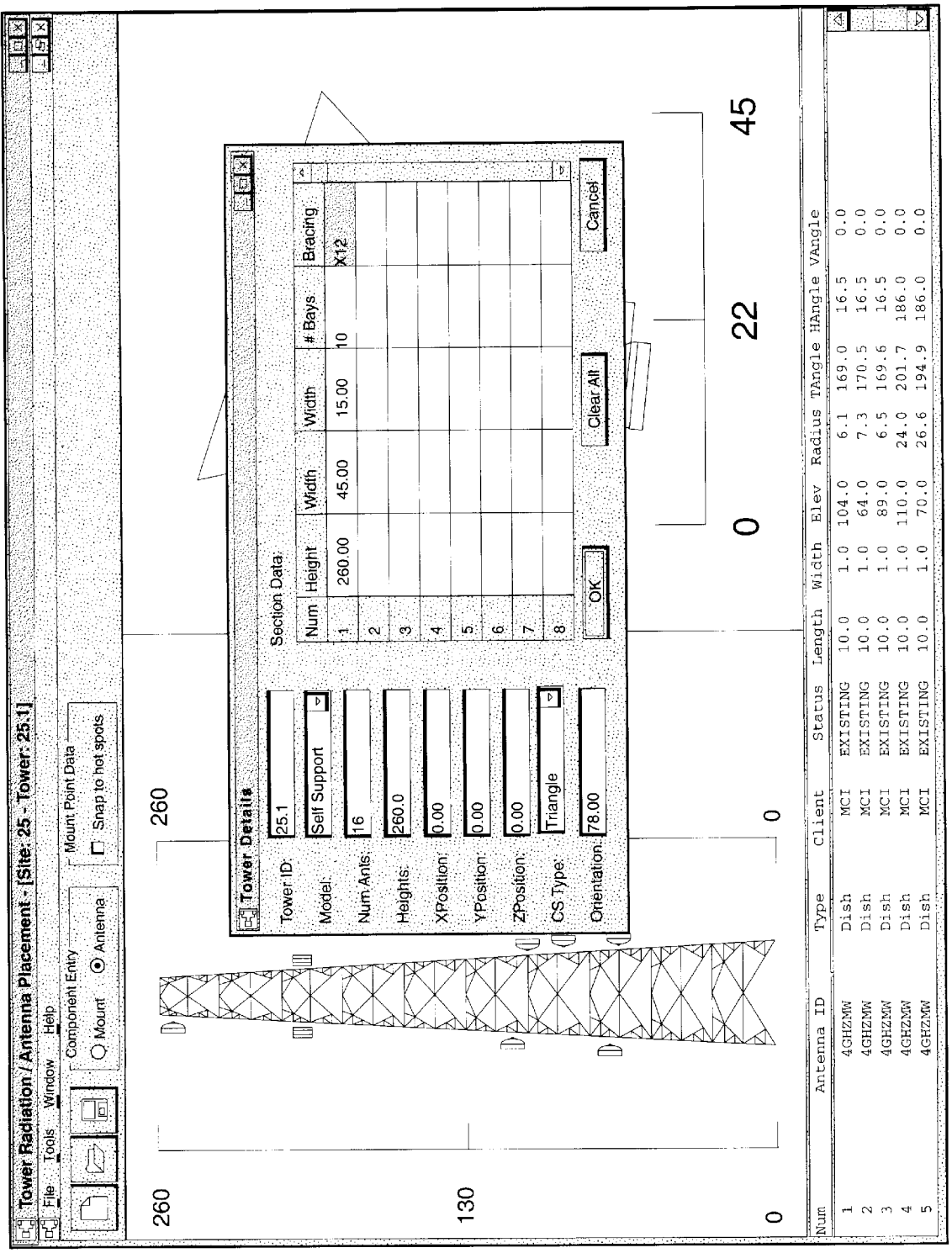

As shown in FIG. 13, if the user selects Edit Tower from the Tools menu a Tower Details data screen appears. This data entry screen allows a user to define the tower structure in detail. The information that is displayed and that may be modified using this data entry screen includes most of the parameters discussed above with respect to tower definitions, including Tower ID, Model, # Antennas, Structure, Height, X Position, Y Position, Z Position, and Orientation. In addition, this screen provides for the entry of Section Data, which is cross-section data on the tower structure. A user can input each section separately (FIG. 13) or, if the section slope, height, and bracing style are the same over the entire tower, the user can input the data with one entry, as shown in FIG. 14.

The Section Data preferably include:

Height: Section height.

Width: Starting width of section.

Width: Ending width of section.

Bays: Number of bays in section.

Bracing: Bracing code of section. The system supports the X1–X12 and K1–K4 bracing codes known in the art.

Using the Tower Details data entry screen, a user can quickly define or modify the structure of a tower.

Figure 15:
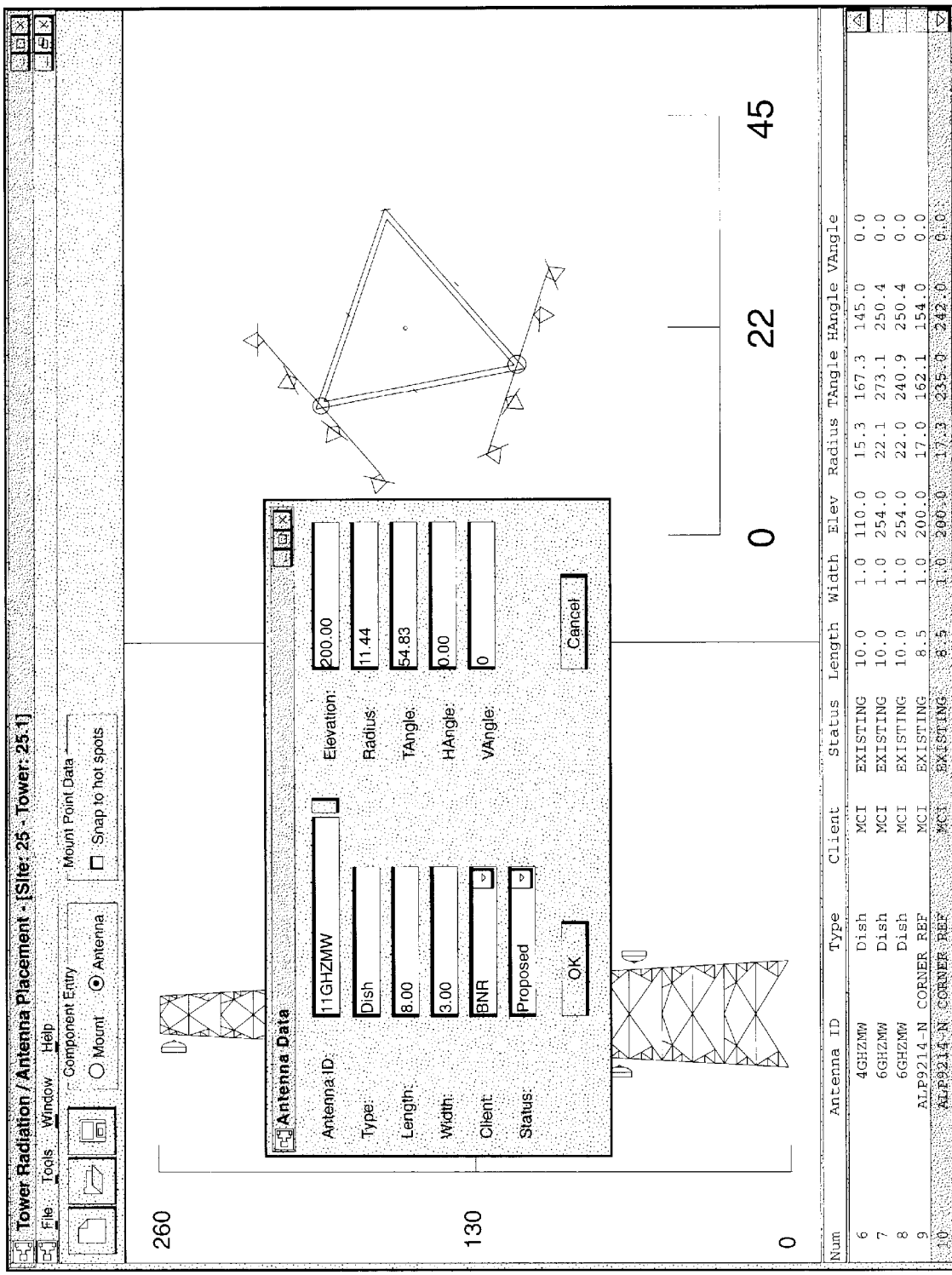

Once the tower structure has been defined, the user may add antennas and mounts using the computer mouse or keyboard. As shown in FIG. 15, when adding an antenna to the tower, an Antenna Data dialog screen is displayed, which enables the user to add/modify the following information on the antenna:

Antenna ID: Antenna model and make (relates antenna to communication characteristics in component definition database discussed above).

Type: Antenna type, e.g., collinear, panel, yagi, dish, horn, dipole, etc.

Length: Antenna length.

Width: Antenna width.

Client: Owner of antenna.

Status: Existing or proposed.

Elevation: Height of antenna on tower.

Radius: Antenna distance from centerline of tower.

TAngle: Position of antenna around tower in degrees referenced from due north.

HAngle: Direction antenna is pointing referenced from due north.

VAngle: Vertical angle of antenna (tilt).

The user can select a particular antenna from the component database discussed above by pressing the "?" button located to the right of the Antenna ID field. The user may then select from existing antennas using the Antenna Data Selection dialog screen shown in FIG. 16, or may add a new antenna to the component database. Once an antenna selection is made from the component database, the Antenna ID, Type, Length, and Width for the antenna are automatically placed in the Antenna Data dialog box. When the user has accepted a new antenna, the antenna appears in the side view display, top view display and in the antenna list box. The user can modify the antenna definition by selecting the antenna with a mouse button. The user can also move an antenna by dragging the antenna to a new location with the mouse.

Figure 17:
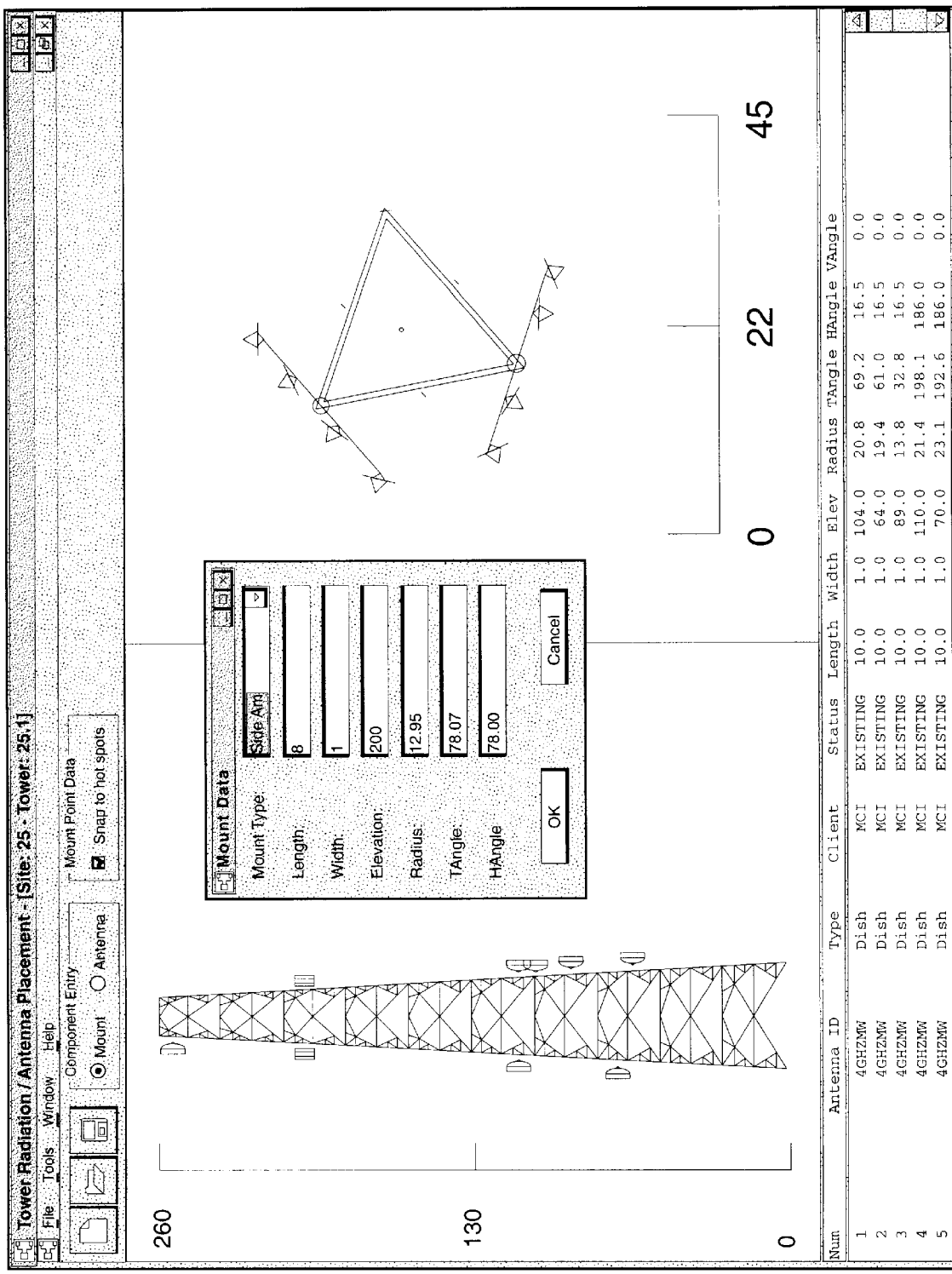

Entry/modification of antenna mounts is identical to the procedure described with respect to antennas but using the Mount Data dialog box shown in FIG. 17. The parameters in this dialog box include:

Mount Type: Mount type, e.g., side arm, sector, platform, tophat, etc.
Length: Mount length in feet.
Width: Mount width in feet.
Elevation: Height of mount on tower.
Radius: Mount distance from center of tower.
TAngle: Mount angle referenced from due North.

Figure 18:
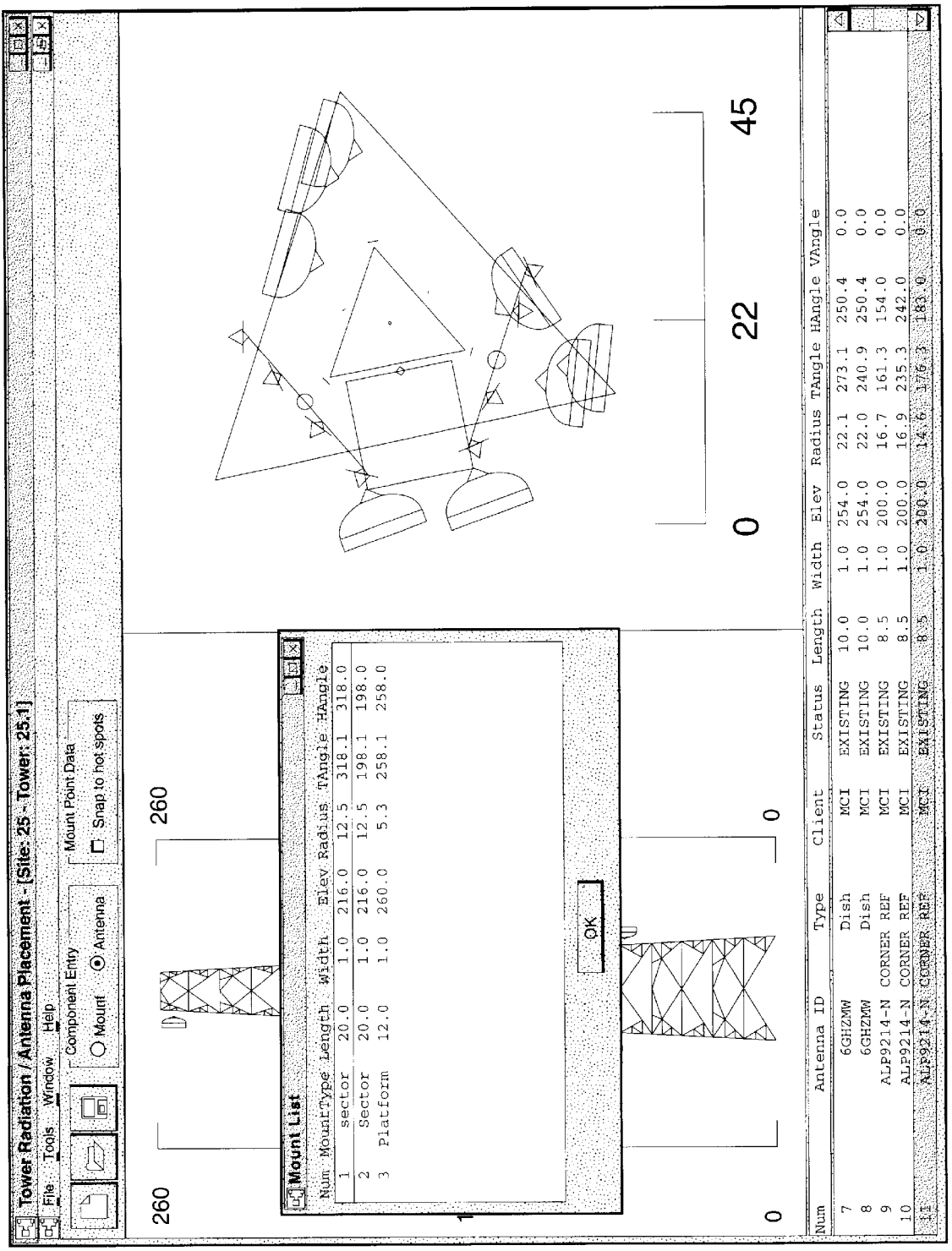

Mounts are preferably displayed only in the top view display. A dialog list of available mounts (FIG. 18) can be displayed by selecting View Mounts under the Tools menu. Data on the available mounts are preferably stored in the Interbase™ database.

Figure 19:
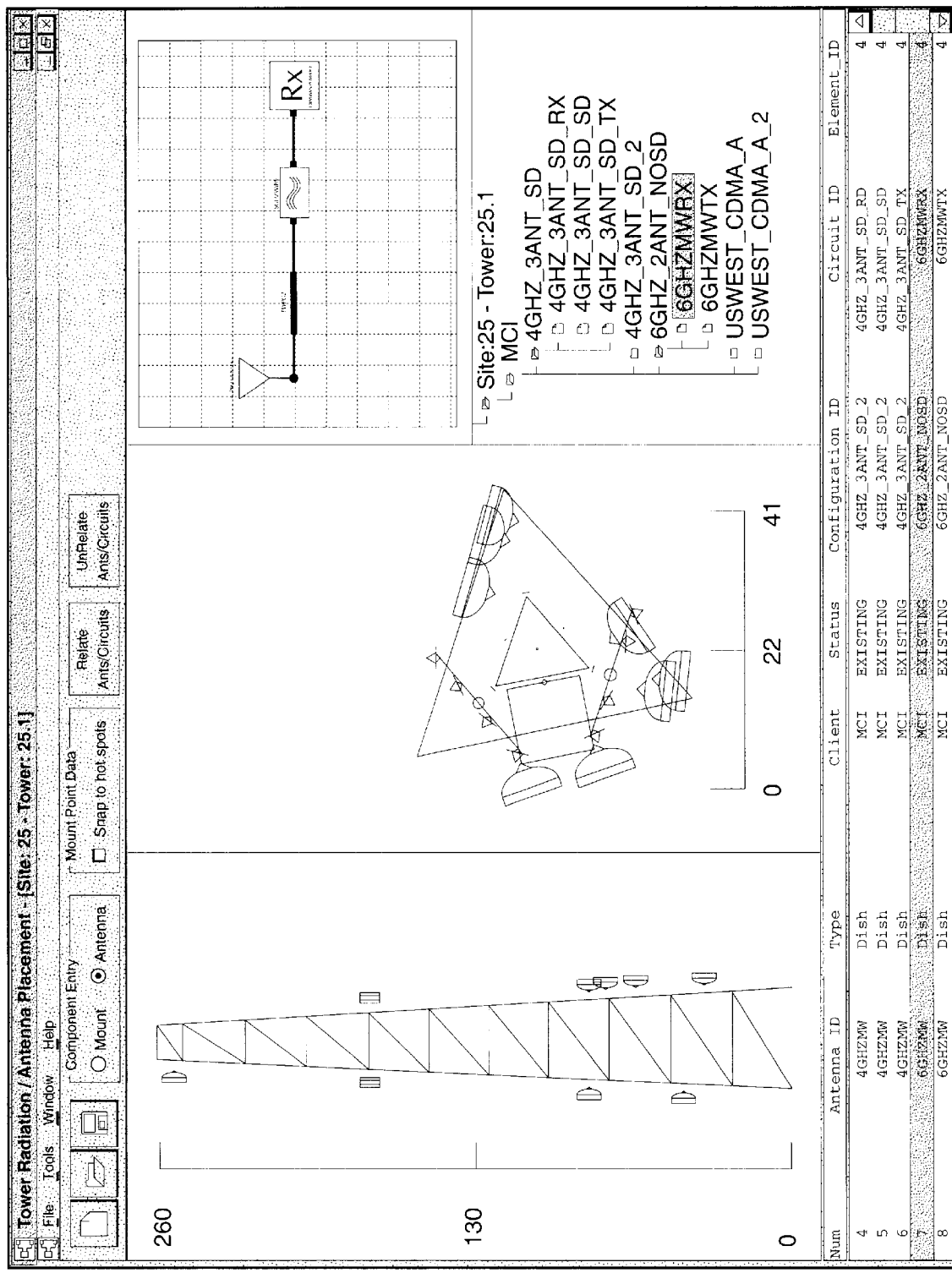

In order to relate the antennas that are mounted on the tower to the defined circuit configurations, the user selects "Relate Antennas→Circuits" under the Tools menu option. As shown in FIG. 19, this displays the block diagram editor, and a list of defined circuits. The user then selects a circuit by highlighting the circuit in the outline (which causes the block diagram of the circuit to be displayed on the screen) and selects an antenna by clicking on an antenna in the top view or by highlighting an antenna in the list box. The user then presses the "Relate" button, causing the system to relate the antenna to the circuit configuration. To delete a relation the user selects an antenna and presses the "UnRelate" button.

Once the circuit configurations have been completed and the antennas placed on the tower, RF interference analysis may be performed.

The present invention performs several types of RF analysis, including the determination of transmitter noise and receiver desensitivity. These types of analysis are conducted in a manner similar to those in prior systems and will not be discussed herein in further detail. However, with respect to the determination of intermodulation interference, the system of the invention uses the improved process of this invention. Unlike prior systems, in which all intermodulation products were calculated, the present system preprocesses the intermodulation products so as to limit the number of intermodulation products only to those that are capable of causing interference. Thus, for all sites with more than a very small number of interfering frequencies, the system and process of the invention reduce the total number of calculations required to perform intermodulation interference analysis.

Figure 20:
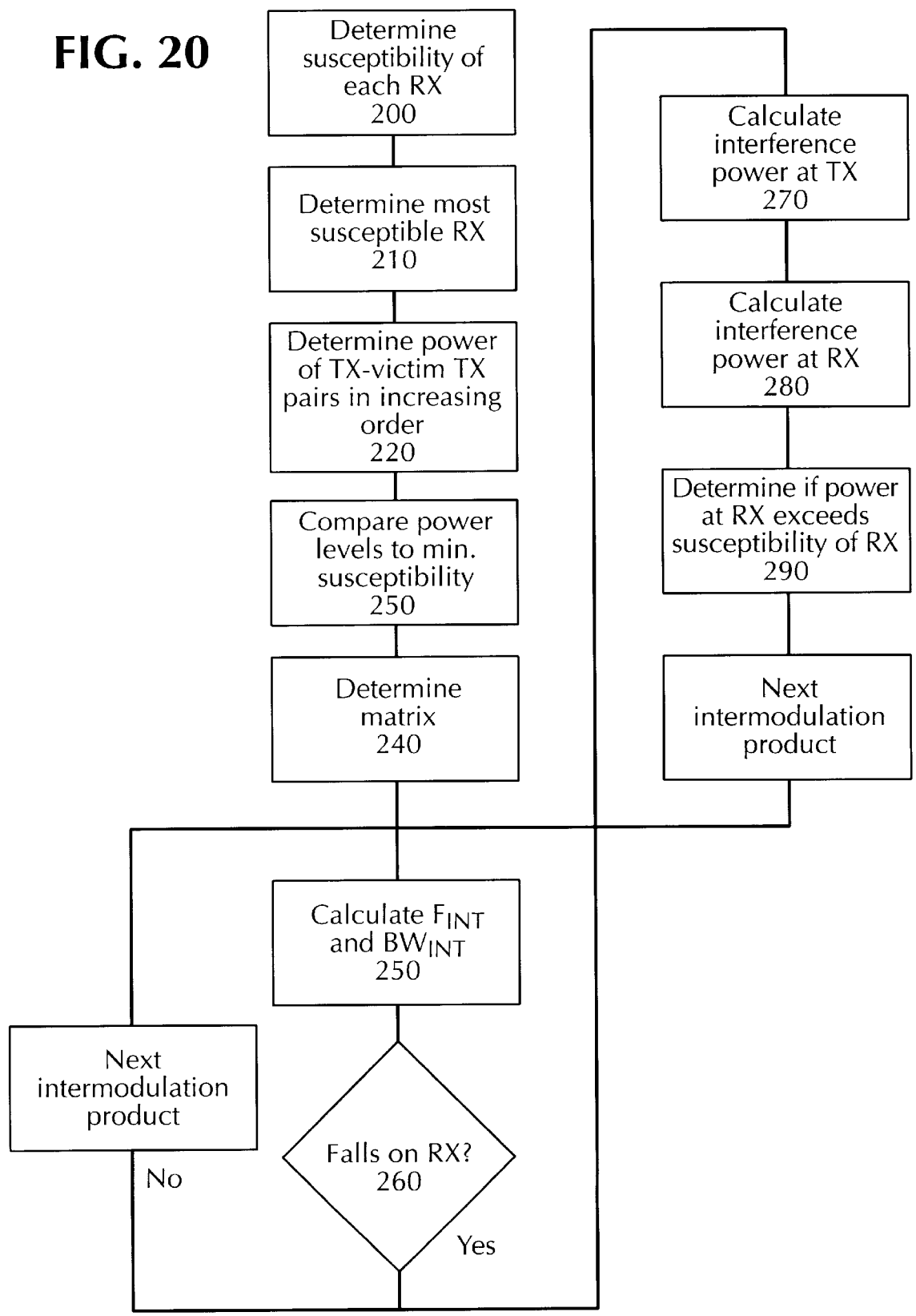
FIG. 20 is a flow diagram showing the process of the invention for determining intermodulation interference in transmitters.

The block diagram in FIG. 20 illustrates the process used in the system of the invention. The first step (200) in the process is for the system to separately consider each transmitter as a source of intermodulation interference (the "victim transmitter"), and to determine the most susceptible receiver at that transmitter. Considering victim transmitter $TX_1$, the susceptibility $S_{R\beta,T1}$ of receiver $RX_\beta$ at transmitter $TX_1$ is calculated as follows:

$$S_{R\beta,T1} = S_{R\beta} - C_{R\beta,T1}$$

where $S_{R\beta}$ is the susceptibility to interference of receiver $RX_\beta$ and $C_{R\beta,T1}$ is the coupling loss between the victim transmitter $TX_1$ and receiver $RX_\beta$. The coupling loss $C_{R\beta,T1}$ between victim transmitter $TX_1$ and receiver $RX_\beta$ is the sum of the coupling losses, at the frequency of $RX_\beta$, between $RX_\beta$ and its antenna $A_{R\beta}$, between $A_{R\beta}$ and the antenna of the transmitter $A_{T1}$, and between $A_{T1}$ and transmitter $TX_1$. Each of these parameters may be readily calculated using techniques known to those skilled in the art.

In this invention, the susceptibility of any given receiver is considered to be the amount of interference within the receiver's bandwidth that will cause a user defined drop in the sensitivity of the receiver (for illustration, a value of 1 dB will be assumed as the drop). To determine susceptibility, the system subtracts the Carrier to Noise Ratio ("C/N ratio") for the receiver from its Usable Sensitivity. This gives the noise level of the system. The system then subtracts 6 dB, which is sufficient to cause a 1 dB change in the noise floor, from the noise level to get the susceptibility. These equations are illustratively shown as follows:

Noise Level at RX=Usable Sensitivity—C/N Ratio
Susceptibility=Noise Level at Receiver—6 dB.

For example, if a narrowband FM receiver has usable sensitivity of −114 dBm and the C/N ratio for FM narrowband is 7 dB:

Noise Level at Receiver=−114−7=−121 dBm
Susceptibility=−121−6=−127dBm.

Thus, the FM receiver of the example has a susceptibility of −127 dBm.

The C/N ratio is often specified by the manufacturer of the receiver, or it may be determined using well-known techniques. Usable sensitivity is the level of the incoming signal required for the receiver to recover the signal at an acceptable or usable quality, and is generally determined by experimental testing. Each of these parameters, i.e., C/N ratio and usable sensitivity, is included in the component database for receivers. For most frequency modulated (FM) systems, the usable sensitivity is defined as an acceptable signal-to-noise and distortion level (SINAD). Most narrowband FM systems use 12 dB SINAD as usable sensitivity. This is measured by injecting an FM signal into the receiver modulated with a 1 kHz audio tone. The recovered audio is fed into a device that can measure the level of the 1 kHz tone and all other noise and distortion being output as well, and 12 dB SINAD occurs when the power level of the audio tone is 12 dB higher than the power level of the noise and distortion. Lower values of SINAD, such as 3 dB SINAD, are not considered usable because the amount of noise and distortion would prevent a listener from understanding the audio being recovered. Higher levels of SINAD such as 20 dB are considered very good (telephone quality) since the noise and distortion are very low compared to the signal.

Other systems such as new digital systems often use Bit Error Rate (BER) to measure quality. This measurement counts the number of bits in error when recovered by the receiver. $10^{-4}$ BER is a common minimum value used for usable sensitivity and means that one bit of $10^4$ or 1 in 10,000 is recovered in error.

No matter which method is used to measure usable sensitivity, in the invention the usable sensitivity is considered to be a measurable level in dBm that represents an RF power level required for the receiver to recover a signal. Depending upon the communication method in use, e.g., FM, AM, or digital systems such as FSK or QPSK, there is a fixed relationship between the RF carrier level and the level of noise being seen by the receiver. For narrowband FM signals the relationship between 12 dB SINAD and the RF Carrier to Noise ratio ("C/N ratio") is 7 dB.

Once the susceptibility of each receiver is determined (200), the system determines the most susceptible receiver to interference at each transmitter (210). For example, for a system with victim transmitter $TX_1$ and receivers $RX_1$ ... $RX_\beta$, the most susceptible receiver $S_{minatT1}$ to interference at $TX_1$ is determined as follows:

$$S_{minatT1} = \min(S_{R1,T1} \ldots S_{R\beta,T1}).$$

The receiver with the lowest numerical susceptibility, i.e., $S_{minatT1}$ is that which requires the least amount of power to cause interference, and is therefore the receiver most susceptible to interference. This step is repeated for each transmitter.

Having determined the most susceptible receiver at each transmitter (210), the system considers each transmitter separately as a victim transmitter and determines the highest order intermodulation product due to interference between the victim transmitter and each other individual transmitter that could cause interference at the most susceptible receiver for the victim transmitter. This determination limits the number of intermodulation product calculations required, in contrast to prior art systems, which calculated all intermodulation products.

The system preferably groups the intermodulation products in order of power level. Generally speaking, the power level of intermodulation products drops with total order of the intermodulation product as shown below:

$$P_{INTatTX}(M,N) > P_{INTatTX}(O,Q)$$

if $M+N < O+Q$
where $M+N$ and $O+Q$ are the total orders of different intermodulation products. In the preferred process for ordering the intermodulation products discussed below, higher order intermodulation products are assumed to have lower power levels. It is foreseen that other processes may be used to order the intermodulation products by power level.

The system separately considers each transmitter as a victim transmitter and determines the power level of the intermodulation products generated due to interference with each other transmitter (individually, i.e., one at a time) (220). These power levels for other transmitter-victim transmitter pairs correspond to the amount of power of the intermodulation products that actually leaves the victim transmitter. The process is started with lowest order intermodulation products, i.e., 2nd order, and then the order is increased. For a transmitter $TX_2$ interfering with a victim transmitter $TX_1$, the interference power $P_{INTatT1}$ at $TX_1$ is calculated as follows:

$$P_{INTatT1} = L_{T2,T1} + \text{ConversionLoss}(\text{Order})$$

where $L_{T2,T1}$ is the leakage power between transmitter $TX_2$ and victim transmitter $TX_1$, ConversionLoss is a lookup table unique to the victim transmitter (defined in component database discussed above, and described in further detail below), and Order is the order of the intermodulation product. $L_{T2,T1}$ is determined using the following equation, which has been previously described:

$$L_{T2,T1} = P_{T2} - C_{T2,T1}$$

where $P_{T2}$ is the power of $TX_2$ and $C_{T2,T1}$ is the coupling loss from $TX_2$ to $TX_1$ at $FT_2$.

An output filter is not used in calculating $P_{INTatT1}$, unlike in prior systems, since the frequency of the possible interference is not known at this time. Only the order is known.

As an example of this step of the process, assume that $TX_1$ is the victim transmitter and that transmitter $TX_2$ is leaking power into $TX_1$. The power that reaches $TX_1$ from $TX_2$ is the leakage power, $L_{T1,T2}$ for $TX_2$. To calculate the power level of an intermodulation product caused by $TX_2$ leaking into $TX_1$, the leakage power $L_{T1,T2}$ is found using the equation above. The conversion loss for $TX_1$ is stored as a "curve" in the components database. A sample conversion loss table for TX1 is shown below:

| Order of Intermodulation product | Conversion Loss (dBm) |
|---|---|
| 2 | −7 |
| 3 | −10 |
| 4 | −20 |
| 5 | −30 |
| 6 | −40 |
| 7 | −50 |
| 8 | −50 |
| 9 | −60 |
| 10 | −60 |
| 11 | −60 |

Thus, assuming that the intermodulation product under consideration is of order 5, and that the leakage power $L_{T1,T2}$ is −40 dBm, the power level of this intermodulation product is:

$$\begin{aligned} P_{INT} &= L_{XT2,TX1} + \text{ConversionLoss}(5) \\ &= -40 + (-30) \\ &= -70 \text{ dBm} \end{aligned}$$

The power level of each intermodulation product for each transmitter-victim transmitter pair is compared, in increasing order, to the susceptibility of the most susceptible receiver at the victim transmitter (230) while $$S_{1minatTX} < P_{INTatTX}(\text{Order}).$$

The highest order that passes the comparison for each transmitter-victim transmitter pair is the highest order of intermodulation product that needs to be calculated between the transmitter-victim transmitter pair. This process is repeated for each transmitter-victim transmitter pair, and the result is stored in a matrix (240). A sample matrix for a site with transmitter $TX_1$–$TX_3$ is shown below:

| Interfering Transmitter | Victim Transmitter | | |
|---|---|---|---|
| | $TX_1$ | $TX_2$ | $TX_3$ |
| $TX_1$ | — | 2 | 11 |
| $TX_2$ | 11 | — | 7 |
| $TX_3$ | 5 | 3 | — |

Once the matrix has been stored, intermodulation products for the transmitters are determined in a process similar to that in prior systems except that the matrix is used to limit the number of intermodulation products calculated. Intermodulation products involving only two transmitters, i.e., an interfering transmitter and a victim transmitter, are calculated only up to the order of the interfering transmitter indicated in the matrix for the interfering transmitter-victim transmitter pair. Intermodulation products involving three or more transmitters, i.e., two or more interfering transmitters and a victim transmitter, are calculated only up to the minimum order indicated in the matrix for all of the interfering transmittervictim transmitter pairs.

For each intermodulation product, an intermodulation product frequency $F_{INT}$ and an intermodulation product bandwidth $BW_{INT}$ are determined (250) as follows:

$$F_{INT} = \pm M_1 \times F_{T1} \pm M_2 \times F_{T2} + \ldots \pm M_\alpha \times F_{T\alpha}$$

$$BW_{INT} = M_1 \times BW_{T1} + M_2 \times BW_{T2} + \ldots + M_\alpha \times BW_{T\alpha}$$

where $[M_1, M_2, \ldots, M_\alpha]$ are positive integers.

Each intermodulation product frequency $F_{INT}$ is then compared to the frequency bands of the receivers to determine if the frequency band of any intermodulation product falls within the frequency band of any receiver (260). If an intermodulation product falls within the band of a receiver $RX_\beta$ (the "victim receiver") at frequency $F_{R\beta}$, i.e., $$\text{IF } F_{INT} \pm \left(\frac{BW_{INT}}{2}\right) \text{ falls within } F_R \pm \left(\frac{BW_R}{2}\right),$$

where $F_R \in \{F_{R1}, F_{RI}, \ldots, F_{R\beta}\}$ then the power of the interference is calculated (270).

First, the power leaking from each interfering transmitter into the victim transmitter $TX_1$ is calculated.

$$L_{T2,T1} = P_{T2} - C_{T2,T1}$$

where $P_{T2}$ is the power of $TX_2$ and $C_{T2,T1}$ is the coupling loss from $TX_2$ to $TX_1$ at $FT_2$.

The transmitter with the lowest leakage power $L_{MIN}$ to the victim transmitter is used to calculate the intermodulation product power level.

$$L_{MIN} = \min(L_{T2,T1}, \ldots L_{T\alpha,T1})$$

The intermodulation product power level at the victim transmitter is calculated from the minimum leakage power as follows:

$$P_{INTatTX} = L_{MIN} + \text{ConversionLoss(order)}$$

When a signal leaks into a transmitter, frequencies closer to the transmitter's frequency are usually coupled into the transmitter more readily than frequencies that are farther away from the transmitter frequency. This relationship can be represented by a curve or filter that represents the response of the coupling over frequency. Although no output filter value is shown in the above equation, such filtering is preferably accounted for in the equation for loss from the transmitter antenna to the transmitter and is therefore bundled with the calculation of the leakage power of each interfering transmitter.

The intermodulation product power level $P_{INTatRX}$ is then calculated at the victim receiver $RX_\beta$ (280) by adding the losses in the coupling $C_{T1,R\beta}$ between the victim transmitter $TX_1$ and the receiver $RX_\beta$ as follows:

$$P_{INTatRX} = P_{INTatTX} + C_{T1,R\beta}$$

where coupling loss $C_{T1,R\beta}$ includes all losses between the victim transmitter and the receiver.

The final step in the analysis (290) is to compare the intermodulation product power level $P_{INTatRX}$ at the receiver $RX_\beta$ to the susceptibility of the receiver $S_{RX\beta}$. If $P_{INTatRX} \geq S_{RX\beta}$ then interference occurs.

As the foregoing demonstrates, the present system limits the calculation of intermodulation products to only those that are capable of causing interference, i.e., those that exceed the minimum susceptibility of the receivers. This enables the system to consider higher orders of intermodulation products and intermodulation products for more combinations of transmitters without considering the vast majority of intermodulation products that are not capable of causing interference. In a preferred embodiment, the system is limited to consideration of intermodulation products up to 11th order, and to combinations of up to five frequencies. It is anticipated that other limits, or no limits at all, may be used, if desired.

The present system uses a similar process for computing intermodulation in receivers. When considering intermodulation in receivers, each receiver is considered individually as a victim, with one or more transmitters causing interference therein. The first step in the process is to calculate the highest intermodulation product order from each transmitter that could cause interference at the victim receiver. This sets the limit of the number of calculations required. The intermodulation product levels are sorted in order of the power of the resulting intermodulation product.

The first step in the sorting process is to calculate the leakage power from the first interfering transmitter $TX_1$ to the victim receiver $RX_1$. The leakage power at the victim receiver is the power of the transmitter $P_{T1}$ minus the coupling loss $C_{T1,R1}$ between the transmitter and receiver.

$$L_{T1,R1} = P_{T1} - C_{T1,R1}$$

The next step in the ordering process is to calculate the intermodulation product power level of the interfering transmitter at the victim receiver at the lowest intermodulation product order, i.e., order 2:

$$P_{INTatRX} = L_{T2,R1} - (\text{Order}-1)*(\text{InterceptPoint(order)} - L_{T2,R1})$$

where $RX_1$ is the victim receiver, $L_{T1,R1}$ is the power leakage between $TX_1$ and $RX_1$, InterceptPoint is a lookup table unique to the victim receiver, and Order is the order of the intermodulation product.

The intercept point method is another method used to calculate intermodulation product power levels. Unlike the conversion loss method, which uses a list of conversion losses, the intercept point method uses a list of intercept points that are used in the equation above. It is believed that the conversion loss method could be used to calculate intermodulation in receivers and that the intercept point method could be used to calculate intermodulation in transmitters. It is further believed that other methods could be used to determine the interference power, and all such other methods are within the scope of the invention.

For each interfering transmitter, starting with lowest order intermodulation products, the power level of each intermodulation product is compared to the receiver susceptibility. If $S_{RX} < P_{INTatRX}$ (Order) then the power level of the next highest order is compared until the comparison fails. The highest order that passes the comparison is the highest order of intermodulation products that needs to be calculated between the interfering transmitter and the victim receiver. This process is repeated for each interfering transmitter-victim receiver pair. The resultant values are stored in a matrix which contains the highest order that must be considered between each interfering transmitter-victim receiver pair.

Once the matrix has been stored, it is used to limit the calculation of intermodulation products. Intermodulation products involving only one interfering transmitter and one victim transmitter are calculated only up to the highest order in the matrix for the interfering transmitter-victim receiver pair. Intermodulation products involving two or more interfering transmitters and a victim transmitter are calculated only up to the minimum order indicated in the matrix for all of the interfering transmitter-victim receiver pairs.

For each intermodulation product, an intermodulation product frequency $F_{INT}$ and an intermodulation product bandwidth $BW_{INT}$ are calculated as follows:

$$F_{INT} = \pm M_1 \times F_{T1} \pm M_2 \times F_{T2} + \ldots \pm M_\alpha \times F_{T\alpha}$$

$$BW_{INT} = M_1 \times BW_{T1} + M_2 \times BW_{T2} + \ldots \pm M_\alpha \times BW_{T\alpha}$$

where $[M_1, M_2, \ldots, M_\alpha]$ are positive integers.

Each intermodulation product $F_{INT}$ is then compared to the frequency band of the victim receiver to determine $$\text{if } F_{INT} \pm \left(\frac{BW_{INT}}{2}\right) \text{ falls within } F_R \pm \left(\frac{BW_R}{2}\right).$$

If an intermodulation product falls within the band of the victim receiver $RX_1$ at frequency $F_{R1}$, then the leakage power between each interfering transmitter $TX_3$ and the victim receiver is calculated:

$$L_{T1,R1} = P_{T1} - C_{T1,R1}$$

where $P_{T1}$ is the power of $TX_1$ and $C_{T1,R1}$ is the coupling loss from $TX_1$ to $RX_1$ at $F_{T1}$.

The leakage power level $L_{MIN}$ of the transmitter with the lowest leakage to the victim receiver $$L_{MIN} = \min(L_{T1,R1}, \ldots, L_{T\alpha,R1})$$

is used to calculate the intermodulation product power level as follows:

$$P_{INT} = L_{MIN} - (\text{Order} - 1)^*(\text{InterceptPoint (order)} - L_{MIN})$$

The final step in the analysis is to compare the intermodulation product power level $P_{INT}$ at the victim receiver $R_\beta$ to the susceptibility of the receiver $S_{R\beta}$. If $P_{INTatRX} \geq S_{R\beta}$ then interference occurs.

By limiting the calculation of intermodulation products to only those that may cause interference, the analysis time may be greatly reduced and the likelihood of missing higher order intermodulation products that may cause interference is reduced.

A hypothetical example of the number of intermodulation products that must be calculated at a typical site, and of the reduction in the number of such calculations provided by the system of the invention, is provided below with respect to the data shown in Tables 1 and 2. Table 1 shows the number of intermodulation products according to the number of sources mixing and the order of the intermodulation products.

TABLE 1

| Order | No. of Sources Mixing ||||| 
|---|---|---|---|---|---|
| | 2 | 3 | 4 | 5 | SUM |
| 2 | 2 | 0 | 0 | 0 | 2 |
| 3 | 4 | 4 | 0 | 0 | 8 |
| 4 | 6 | 12 | 8 | 0 | 26 |
| 5 | 8 | 24 | 32 | 16 | 80 |
| 6 | 10 | 40 | 80 | 80 | 210 |
| 7 | 12 | 60 | 160 | 240 | 472 |
| 8 | 14 | 84 | 280 | 560 | 938 |
| 9 | 16 | 112 | 448 | 1120 | 1696 |
| 10 | 18 | 144 | 672 | 2016 | 2850 |
| 11 | 20 | 180 | 960 | 3360 | 4520 |
| | 110 | 660 | 2640 | 7392 | 10802 |

Table 2 shows the number of intermodulation product sets according to the number of sources mixing and the total number of frequencies.

TABLE 2

| No. of Frequencies Mixing | No. of Sources Mixing ||||| 
|---|---|---|---|---|---|
| | 2 | 3 | 4 | 5 | SUM |
| 2 | 2 | Ð | Ð | Ð | |
| 5 | 10 | 10 | 5 | 1 | 26 |
| 10 | 45 | 120 | 210 | 252 | 627 |
| 20 | 190 | 1140 | 4,845 | 15,504 | 21,679 |
| 30 | 435 | 4,060 | 27,405 | 142,506 | 174,406 |
| 40 | 780 | 9,880 | 91,390 | 658,008 | 760,058 |
| 50 | 1,225 | 19,600 | 230,300 | 211,876 | 2,369,885 |
| 60 | 1,770 | 34,220 | 487,635 | 5,461,512 | 5,985,137 |
| 70 | 2,415 | 54,740 | 916,895 | 12,103,014 | 1,3077,064 |
| 80 | 3,160 | 82,160 | 1,581,580 | 24,040,016 | 2,5706,916 |
| 90 | 4,005 | 177,480 | 2,555,190 | 43,949,268 | 4,6625,943 |
| 100 | 4,950 | 161,700 | 3,921,225 | 75,287,520 | 79,375,395 |

Assume that a site has 20 frequencies and that calculations are being done for up to 3 frequencies mixing to a maxium of 7th order. From Table 1, the contents of the shaded area is added for each row of frequencies mixing. The sums are 42 intermodulation products of two frequencies mixing and 140 intermodulation products of three frequencies mixing.

From Table 2 the number of combinations of frequencies for two frequencies mixing is 190 and for three frequencies mixing is 1,140. Separately multiplying for each number of frequencies mixing yields 190×42=7,980 intermodulation products for two-frequency mixes and 140×1140=159,600 intermodulation products for three-frequency mixes, for a total of 167,580 intermodulation products Thus, prior systems would require 167,580 calculations for this example.

Assuming that because of the process of the invention the number of intermodulation products was reduced to the equivalent of two sites, each with 10 frequencies that mix to the 7th order for each of two frequency combinations and three frequency combinations. This is the equivalent of determining that 10 of the frequencies at the 20 frequency site do not mix at sufficient levels to affect half of the receivers and that the other 10 frequencies at the site do not mix at sufficient levels to affect the other half of the receivers. In this example, the number of intermodulation products would be 2×45×42=3,780 for two frequency mixes and 2×140×120=33,600 for three frequency mixes, for a total of 37,380 intermodulation products. This is approximately ¼ to ⅕ the total number of calculations done in the prior systems. Even if, due to the pre-processing required in the invention, each calculation takes twice as long on average than as in prior systems, the reduction in the overall number of calculations is still significant. Only for small sites with few combinations of frequencies will the prior systems outperform the system of the invention. Thus, by pre-calculating the intermodulation product power levels, the system limits the number of calculations necessary for analyzing complicated sites.

EXAMPLE

Figure 21:
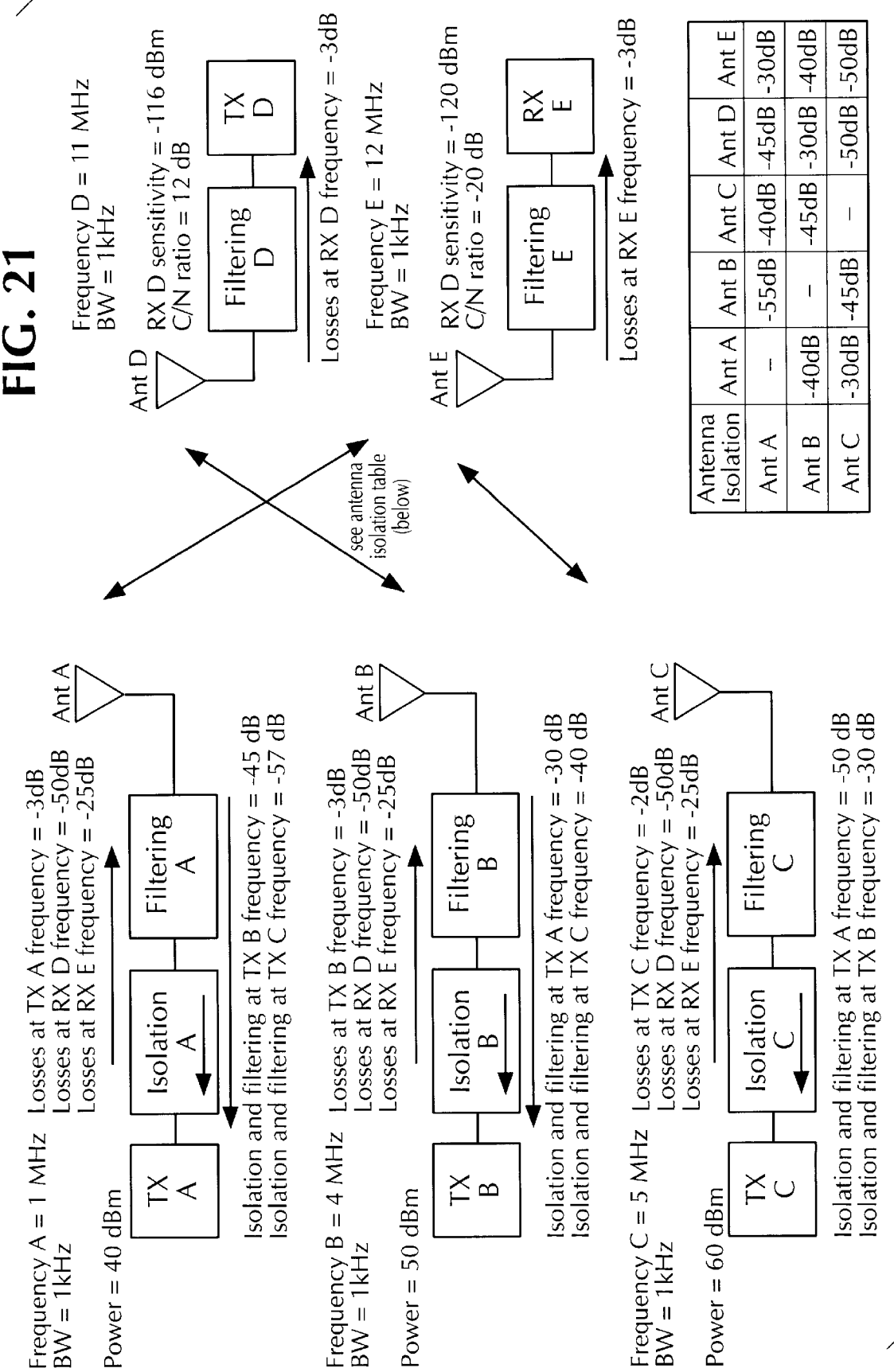
FIGS. 21–24 show block diagrams and tables for an example of the process for determining intermodulation interference in transmitters.

The transmitter intermodulation process described above will now be applied with respect to the example shown in FIGS. 21–24. FIG. 21 indicates the specifications of each of the transmitters TX A–TX C, receivers RX D and RX E, and antennas ANT A–ANT E used in the example.

Victim Transmitter A

Figure 22:
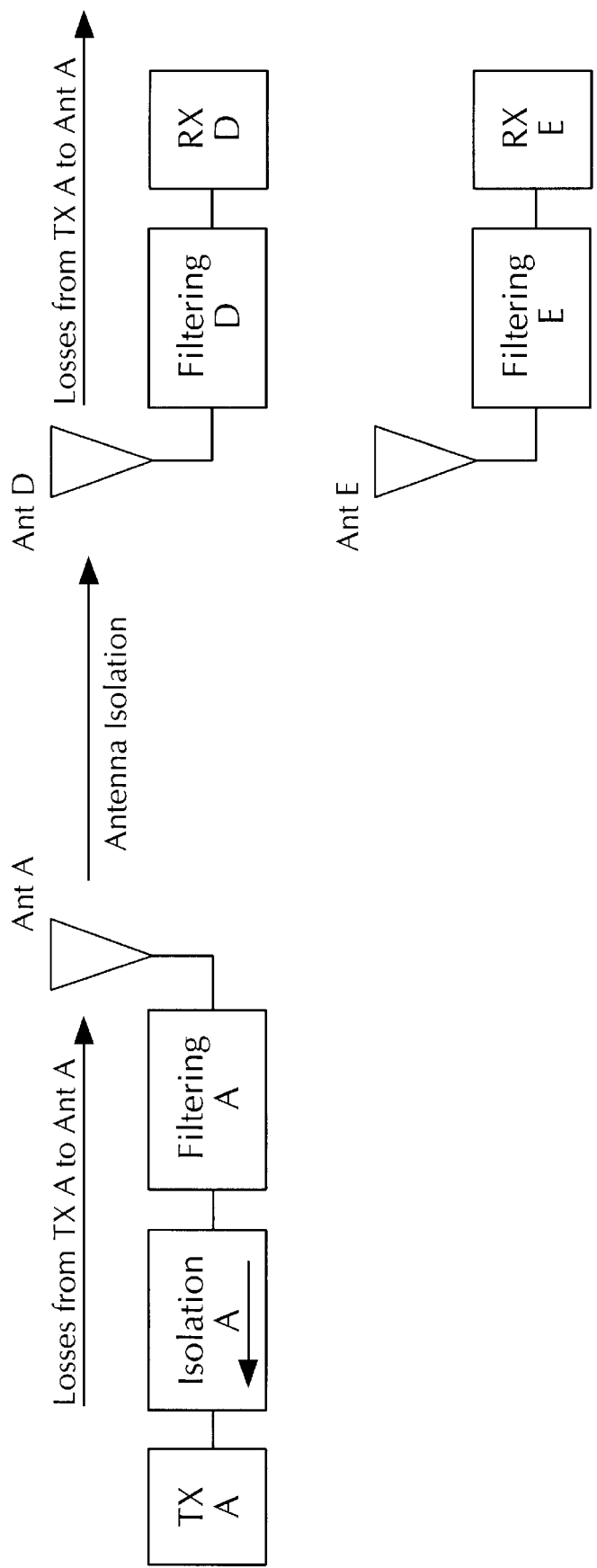

STEP 1—Calculate the most susceptible receiver at transmitter TX A (FIG. 22).

| | | |
|---|---|---|
| a) | Susceptibility of RX D | = Sensitivity of RX D – C/N Ratio – 6 dB<br>= –116 dBm – 12 dB – 6 dB<br>= –134 dBm |
| b) | Susceptibility of RX D at TX A | = Susceptibility of RX D – Losses from ANT D to RX D at Frequency of RX D – Antenna Isolation between ANT A and ANT D at Frequency of RX D – Losses from TX A to ANT A at Frequency of RX D.<br>= –134 dBm – (–3 dB) – (–45 dB) – (–50 dB)<br>= –36 dBm |
| c) | Susceptibility of RX E | = –120 dBm – (–20 dB) – 6<br>= –106 dBm |
| d) | Susceptibility of RX E at TX A | = –106 – (–3 dB) – (–30 dB) – (–25 dB)<br>= –48 dBm |
| e) | Most Susceptible RX at TX A | = min(of all Susceptibilities)<br>= min(–36 dBm, –48 dBm)<br>= –48 dBm |

STEP 2—For the first other transmitter at the site (TX B) calculate its leakage power and compare to most susceptible receiver (–48 dBm). (See FIG. 23)

Figure 23:
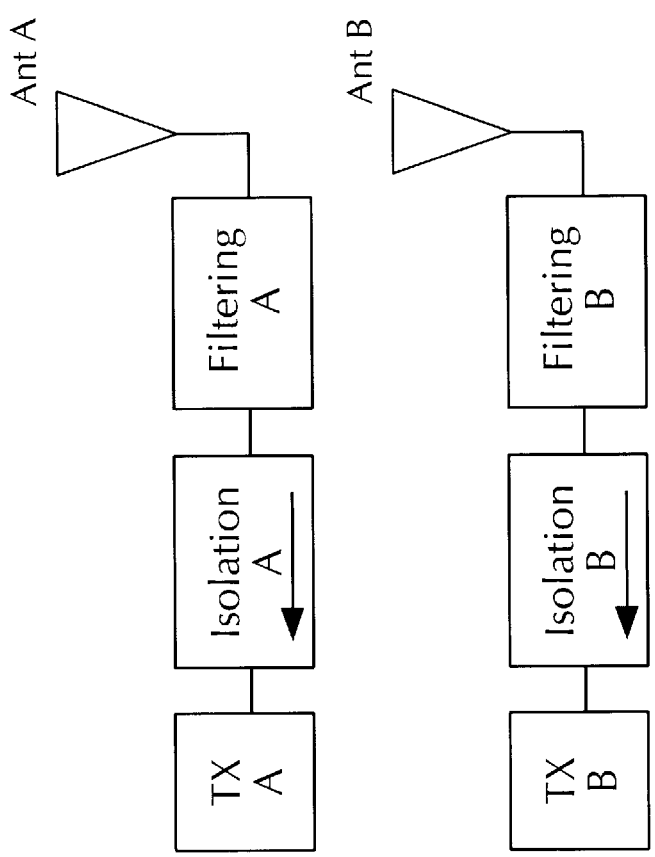

| | | |
|---|---|---|
| a) | Leakage Power of TX B at TX A | = Power of TX B – Losses from TX B at ANT B at Frequency of TX B – Antenna Isolation from ANT B to ANT A at Frequency of TX B – Losses from Filtering and Isolation from ANT A to TX A at Frequency of TX B<br>= 50 dBm – 3 dB – 40 dB – 45 dB<br>= –38 dBm |
| b) | Find the highest order that could cause interference.<br>Let order = 2<br>do<br>   Intermod Level = Leakage Power + Conversion Loss(order)<br>   increment order<br>repeat until (Intermod Level < most Susceptible RX or 12)<br>Possible TXIM = order –1<br>Using Conversion Loss Table shown in FIG. 23 | |

Intermod Level = –38 + (–7) = –45 dBm > –48 dBm
                = –38 + (–10) = –48 dBm = –48 dBm
                = –38 + (–15) = –53 dBm < –48 dBm
Possible TXIM = 4 – 1 = 3rd order
Enter Possible TXIM into matrix (FIG. 23)

Figure 24:
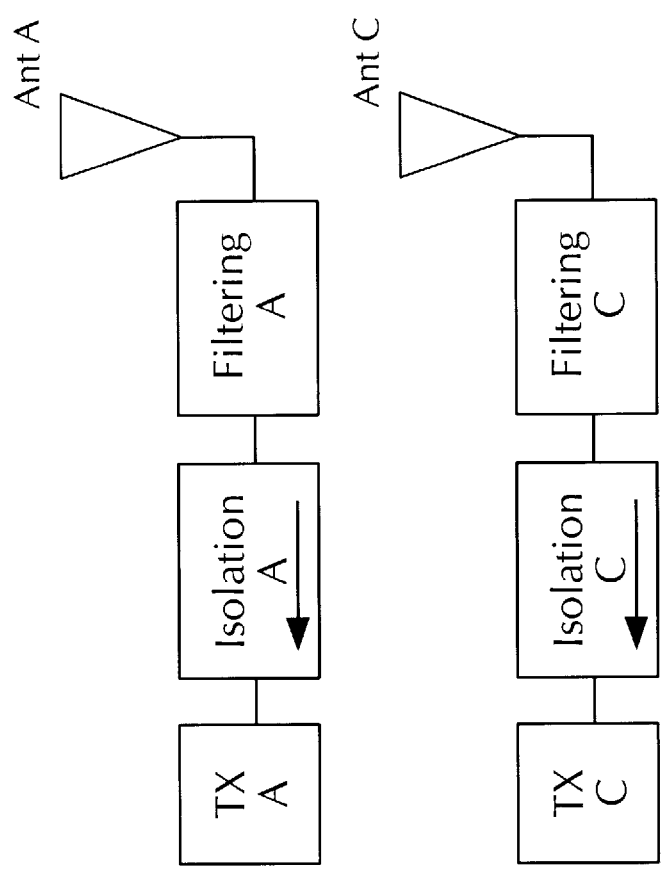

STEP 3—Repeat Step 2 for every other TX at the site (See FIG. 24).

| | | |
|---|---|---|
| a) | Leakage Power of TX C at TX A | = Power of TX C – Losses from TX C to ANT C at Frequency of TX C – Antenna Isolation from ANT C to ANT A at Frequency of TX C – Losses from Filtering and Isolation from ANT A to TX A at Frequency of TX C<br>= 60 dBm – 2 dB – 30 dB – 57 dB<br>= –29 dBm |
| b) | Find the highest order that could cause interference.<br>Let order = 2<br>do<br>   Intermod Level = Leakage Power + Conversion Loss(order)<br>   increment order<br>repeat until (Intermod Level < most Susceptible RX or 12)<br>Possible TXIM = order –1; if Possible TXIM = 1 then Possible TXIM = 0<br>Using Conversion Loss Table shown in FIG. 23 | |

Intermod Level = –29 + (–7) = –36 dBm > –48 dBm
                = –29 + (–10) = –39 dBm > –48 dBm
                = –29 + (–15) = –42 dBm > –48 dBm
                = –29 + (–20) = –49 dBm < –48 dBm
Possible TXIM = 5 – 1 = 4th order
Enter Possible TXIM into matrix (FIG. 24)

Victim Transmitter B

STEP 4—Repeat Steps 1–3 for TX B as victim at the site.

| | | |
|---|---|---|
| 1) | Susceptibility of RX D at TX B | = –134 dBm – (–3 dB) – (–30 dB) – (–50 dB)<br>= –51 dBm |
| | Susceptibility of RX E at TX B | = –106 dBm – (–3 dB) – (–40 dB) – (–25 dB)<br>= –38 dBm |
| | Most Susceptible | = min(–51 dBm, –38 dBm)<br>= –51 dBm |
| 2) | Leakage Power of TX A at TX B | = 40 dBm – 3 dB – 55 dB – 30 dB<br>= –48 dBm |
| | Leakage Power + ConversionLoss(order) | = –48 dBm + (–7 dB)<br>= –55 dBm < –51 dBm |
| | Possible TXIM = 0 | |
| 3) | Leakage Power of TX C at TX B | = 60 dBm – 2 dB – 45 dB – 40 dB<br>= –27 dBm |

Leakage Power + Conversion Loss(order)
    = –27 dBm – (–7 dB) = –34 dBm > –51 dBm
    = –27 dBm – (–10 dB) = –37 dBm > –51 dBm
    = –27 dBm – (–15 dB) = –42 dBm > –51 dBm
    = –27 dBm – (–20 dB) = –47 dBm > –51 dBm
    = –27 dBm – (–30 dB) = –57 dBm < –51 dBm
Possible TXIM = 5
Enter TXIMs into matrix:

| TXIM | TX A | TX B | TX C |
|---|---|---|---|
| TX A | — | 3 | 4 |
| TX B | 0 | — | 5 |
| TX C | ? | ? | — |

STEP 5—Repeat Steps 1–3 for TX C as victim at the site.

| | | |
|---|---|---|
| 1) | Susceptibility of RX D at TX C | = –134 dBm – (–3 dB) – (–50 dB) – (–50 dB)<br>= –31 dBm |
| | Susceptibility of RX E at TX C | = –106 dBm – (–3 dB) – (–50 dB) – (–25 dB)<br>= –28 dBm |

-continued

| | | |
|---|---|---|
| | Most Susceptible | = min(−31 dBm, −28 dBm) = −31 dBm |
| 2) | Leakage Power of TX A at TX C | = 40 dBm − 3 dB − 40 dB − 50 dB = −53 dBm |
| | Leakage Power + ConversionLoss(order) | = −53 dBm + (−7 dB) = −60 dBm < −31 dBm |
| | Possible TXIM = 0 | |
| 3) | Leakage Power of TX B at TX C | = 50 dBm − 3 dB − 45 dB − 30 dB = −28 dBm |
| | Leakage Power + Conversion Loss(order) | = −28 dBm + (−7 dB) = −35 dBm < −31 dBm |
| | Possible TXIM = 0 | |
| | Enter TXIMs into matrix: | |

| TXIM | TX A | TX B | TX C |
|---|---|---|---|
| TX A | — | 3 | 4 |
| TX B | 0 | — | 5 |
| TX C | 0 | 0 | — |

Frequency Generation

STEP 6—Calculate two TX intermodulation products a) Starting at TX A calculate the frequency and bandwidth of all intermodulation products between Frequency A and Frequency B up to order 3.

| MixType | 1 + 1 | CenterFrequency = 1 + 4 = 5 MHz |
|---|---|---|
| | | BW = 1 + 1 = 2 kHz |
| | 1 − 1 | CenterFrequency = 1 − 4 = −3 = 3 MHz |
| | | BW = 1 + 1 = 2 kHz |
| | 1 + 2 | CenterFrequency = 1 + 2 * (4) = 9 MHz |
| | | BW = 1 + 2 = 3 kHz |
| | 1 − 2 | CenterFrequency = 1 − 2 * (4) = 7 MHz |
| | | BW = 1 + 2 = 3 kHz |
| | 2 − 1 | CenterFrequency = 2 * (1) − 4 = 2 MHz |
| | | BW = 1 + 2 = 3 kHz |
| | 2 + 1 | CenterFrequency = 2 * (1) + 4 = 6 MHz |
| | | BW = 1 + 2 = 3 kHz | b) Calculate the frequency and bandwidth of all intermodulation products between Frequency A and Frequency C up to order 4.

| MixType | 1 + 1 | CenterFrequency = 1 + 5 = 6 MHz |
|---|---|---|
| | | BW = 1 + 1 = 2 kHz |
| | 1 − 1 | CenterFrequency = 1 − 5 = 4 MHz |
| | | BW = 1 + 1 = 2 kHz |
| | 1 + 2 | CenterFrequency = 1 + 2 * (5) = 11 MHz |
| | | BW = 1 + 2 = 3 kHz |
| | 1 − 2 | CenterFrequency = 1 − 2 * (5) = 9 MHz |
| | | BW = 1 + 2 = 3 kHz |
| | 2 − 1 | CenterFrequency = 2 * (1) − 5 = 3 MHz |
| | | BW = 1 + 2 = 3 kHz |
| | 2 + 1 | CenterFrequency = 2 * (1) + 5 = 7 MHz |
| | | BW = 1 + 2 = 3 kHz |
| | 2 + 2 | CenterFrequency = 2 * (1) + 2 * (5) = 12 MHz |
| | | BW = 2 + 2 = 4 kHz |
| | 2 − 2 | CenterFrequency = 2 * (1) − 2 * (5) = 8 MHz |
| | | BW = 2 + 2 = 4 kHz |
| | 3 − 1 | CenterFrequency = 3 * (1) − (5) = 2 MHz |
| | | BW = 1 + 3 = 4 kHz |
| | 3 + 1 | CenterFrequency = 3 * (1) + (5) = 8 MHz |
| | | BW = 1 + 3 = 4 kHz |
| | 1 − 3 | CenterFrequency = (1) − 3 * (5) = 14 MHz |
| | | BW = 1 + 3 = 4 kHz |
| | 1 + 3 | CenterFrequency = (1) + 3 * (5) = 16 MHz |
| | | BW = 1 + 3 = 4 kHz | c) Calculate the frequency and bandwidth of all intermodulation products between Frequency B and Frequency C up to 5th order.

| MixType | 1 + 1 | CenterFrequency = 4 + 5 = 9 MHz |
|---|---|---|
| | | BW = 1 + 1 = 2 kHz |
| | 1 − 1 | CenterFrequency = 4 − 5 = −1 = 1 MHz |
| | | BW = 1 + 1 = 2 kHz |
| | 1 + 2 | CenterFrequency = 4 + 2 * (5) = 14 MHz |
| | | BW = 1 + 2 = 3 kHz |
| | 1 − 2 | CenterFrequency = 4 − 2 * (5) = 6 MHz |
| | | BW = 1 + 2 = 3 kHz |
| | 2 − 1 | CenterFrequency = 2 * (4) − 5 = 3 MHz |
| | | BW = 1 + 2 = 3 kHz |
| | 2 + 1 | CenterFrequency = 2 * (4) + 5 = 13 MHz |
| | | BW = 1 + 2 = 3 kHz |
| | 2 + 2 | CenterFrequency = 2 * (4) + 2 * (5) = 18 MHz |
| | | BW = 2 + 2 = 4 kHz |
| | 2 − 2 | CenterFrequency = 2 * (4) − 2 * (5) = 2 MHz |
| | | BW = 2 + 2 = 4 kHz |
| | 3 − 1 | CenterFrequency = 3 * (4) − (5) = 7 MHz |
| | | BW = 1 + 3 = 4 kHz |
| | 3 + 1 | CenterFrequency = 3 * (4) + (5) = 17 MHz |
| | | BW = 1 + 3 = 4 kHz |
| | 1 − 3 | CenterFrequency = (4) − 3 * (5) = 11 MHz |
| | | BW = 1 + 3 = 4 kHz |
| | 1 + 3 | CenterFrequency = (4) + 3 * (5) = 19 MHz |
| | | BW = 1 + 3 = 4 kHz |
| | 1 + 4 | CenterFrequency = (4) + 4 * (5) = 24 MHz |
| | | BW = 1 + 4 = 4 kHz |
| | 1 − 4 | CenterFrequency = (4) − 4 * (5) = 16 MHz |
| | | BW = 1 + 4 = 4 kHz |
| | 4 − 1 | CenterFrequency = 4 * (4) − (5) = 11 MHz |
| | | BW = 1 + 4 = 4 kHz |
| | 4 + 1 | CenterFrequency = 4 * (4) + (5) = 21 MHz |
| | | BW = 1 + 4 = 4 kHz |
| | 3 + 2 | CenterFrequency = 3 * (4) + 2 * (5) = 22 MHz |
| | | BW = 3 + 2 = 5 kHz |
| | 2 + 3 | CenterFrequency = 2 * (4) + 3 * (5) = 23 MHz |
| | | BW = 3 + 2 = 5 kHz |
| | 2 − 3 | CenterFrequency = 2 * (4) − 3 * (5) = 7 MHz |
| | | BW = 3 + 2 = 5 kHz |
| | 3 − 2 | CenterFrequency = 3 * (4) − 2 * (5) = 2 MHz |
| | | BW = 3 + 2 = 5 kHz |

STEP 7—Calculate three TX intermodulation products a) For TX A, calculate the frequency and bandwidth of all intermodulation products between Frequency A, Frequency B and Frequency C up to the min(3,4) = 3.

| Mixlevel | | |
|---|---|---|
| 1 + 1 + 1 | | CenterFrequency = 1 + 4 + 5 = 10 MHz |
| | | BW = 1 + 1 + 1 = 3 kHz |
| 1 + 1 − 1 | | CenterFrequency = 1 + 4 − 5 = 0 MHz |
| | | BW = 1 + 1 + 1 = 3 kHz |
| 1 − 1 + 1 | | CenterFrequency = 1 − 4 + 5 = 2 MHz |
| | | BW = 1 + 1 + 1 = 3 kHz |
| 1 − 1 − 1 | | CenterFrequency = 1 − 4 − 5 = 8 MHz |
| | | BW = 1 + 1 + 1 = 3 kHz |

STEP 8—Determine interfering intermodulation products.

a) Of the Intermodulation products generated at TX A, two fall into the bands of the receivers. Calculate intermodulation power level and compare to susceptibility.

1 + 2    CenterFrequency = 1 + 2 * (5) = 11 MHz
               BW = 1 + 2 = 3 kHz Leakage Power + Conversion Level(order) > Receiver susceptibility
= −29 + (−10) = −39 dBm < −36 dBm, will not cause interference.

2 + 2    CenterFrequency = 2 * (1) + 2 * (5) = 12 MHz
               BW = 2 + 2 = 4 kHz = −29 + (−15) = −44 dBm > −48 dBm, will cause interference b) Of the Intermodulation products generated at TX B, two fall into the bands of the receivers.

1 − 3    CenterFrequency = (4) − 3 * (5) = 11 MHz
               BW = 1 + 3 = 4 kHz = −27 + (−15) = −42 dBm > −51 dBm, will cause interference 4 − 1    CenterFrequency = 4 * (4) − (5) = 11 MHz
               BW = 1 + 4 = 5 kHz -continued = −27 + (−20) = −47 dBm > −51 dBm, will cause interference
Result − 4 intermodulation products will cause interference.

Figure 25:
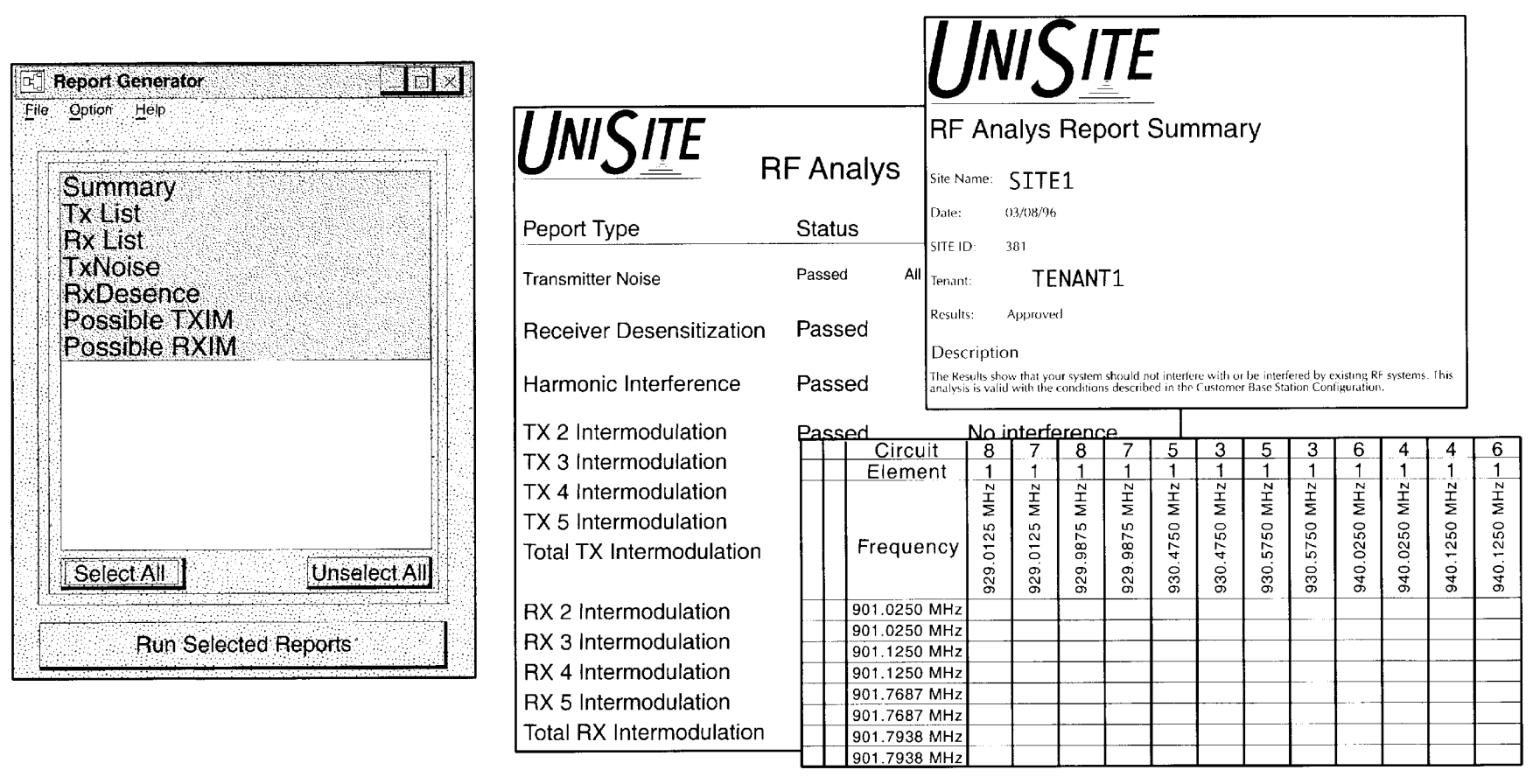

Finally, as shown in FIG. 25, the system of the invention includes a report generation module. The report generation module enables the user to select different types of reports on the results of the RF analysis that was conducted. In a preferred embodiment, the system is capable of generating reports of transmitter noise, receiver desensitivity, and possible transmitter and receiver intermodulation. It is foreseen that other types of reports may be implemented, if desired.

Although the present invention has been described in detail with respect to certain embodiments and examples, variations and modifications exist which will be apparent to those skilled in the art and which are within the scope of the present invention as defined in the following claims.

We claim:

1. In a process for determining intermodulation interference between two or more transmitters and one or more receivers, the steps of:
   a) at each transmitter, determining a minimum susceptibility to interference of the one or more receivers;
   b) separately considering each transmitter as a victim transmitter paired with each other transmitter, and for each such other transmitter-victim transmitter pair, determining a highest order intermodulation product generated as a result of interference between the victim transmitter and the other transmitter with a power level sufficient to exceed the minimum susceptibility of the one or more receivers at the victim transmitter, and storing the highest order intermodulation product for each other transmitter-victim transmitter pair; and
   c) separately considering each transmitter as a victim transmitter, and for each victim transmitter determining the intermodulation products generated as a result of interference between the victim transmitter and all of the at least one other transmitters, each other transmitter having a leakage power to the victim transmitter, the one of the at least one other transmitters having the lowest leakage power to the victim transmitter being the minimum leakage transmitter for that victim transmitter, the minimum leakage transmitter and the victim transmitter together constituting a minimum leakage transmitter-victim transmitter pair, the intermodulation products for each victim transmitter being determined in this step up to the highest order intermodulation product determined in step (b) for the other transmitter-victim transmitter pair that is the same as the minimum leakage transmitter-victim transmitter pair.

2. The process according to claim 1 wherein the step of determining the minimum susceptibility of the one or more receivers at each transmitter comprises the steps of:
   separately considering each transmitter as victim transmitter, and determining the susceptibility of each receiver at the victim transmitter; and
   determining the minimum of the susceptibilities of the one or more receivers at the victim transmitter.

3. The process according to claim 2 wherein the step of determining the susceptibility of each receiver at the victim transmitter comprises determining the coupling loss between such receiver and the victim transmitter, determining the susceptibility to interference of such receiver at the receiver, and subtracting the coupling loss between such receiver and the victim transmitter from the susceptibility to interference of such receiver at the receiver.

4. The process according to claim 3 wherein the coupling loss between each receiver and the victim transmitter is determined by summing the coupling losses, at the frequency of the receiver, between the receiver and an antenna of the receiver, between the antenna of the receiver and an antenna of the victim transmitter, and between the antenna of the victim transmitter and the victim transmitter.

5. The process according to claim 3 wherein the susceptibility to interference of the receiver is determined by the steps of:
   determining a noise level at the receiver by subtracting a carrier-to-noise ratio of the receiver from a usable sensitivity of the receiver; and
   determining the susceptibility of the receiver by subtracting 6 dB from the noise level at the receiver.

6. The process according to claim 1 wherein the step of determining a highest order intermodulation product generated as a result of interference between the victim transmitter and each other individual transmitter with a power level sufficient to exceed the minimum susceptibility at the victim transmitter comprises the steps of:
   for each individual transmitter at each order, determining the power level $P_{INTatTX}$ for such transmitter as sum of the power leakage $L_{T2,T1}$ between such transmitter and the victim transmitter and the conversion loss for the victim transmitter at such order; and
   comparing the power level $P_{INTatTX}$ to the minimum susceptibility at the victim transmitter.

7. The process according to claim 1 further comprising the step of storing the highest order intermodulation product for each other transmitter-victim transmitter pair in a matrix.

8. The process according to claim 7 further comprising the following step after the step of determining the intermodulation products up to the highest order intermodulation product of the minimum leakage transmitter-victim transmitter pair:
   for each such intermodulation product, determining an intermodulation product frequency $F_{INT}$ and an intermodulation product bandwidth $BW_{INT}$ as follows:

$$F_{INT} = \pm M_1 \times F_{T1} \pm M_2 \times F_{T2} + \ldots \pm M_\alpha \times F_{T\alpha}$$

$$BW_{INT} = M_1 \times BW_{T1} + M_2 \times BW_{T2} + \ldots + M_\alpha \times BW_{T\alpha}$$

where $[M_1, M_2, \ldots, M_\alpha]$ are positive integers.

9. The process according to claim 8 further comprising the following steps after the step of determining the intermodulation product frequency $F_{INT}$ and intermodulation product bandwidth $BW_{INT}$:
   comparing each intermodulation product frequency to the frequency band of each receiver to determine if the frequency band of any intermodulation product falls within the frequency band of any receiver;
   identifying interfering intermodulation products, each with an intermodulation product frequency falling within the band of one of the receivers $RX_\beta$ at frequency $F_{R\beta}$, each interfering intermodulation product being generated by intermodulation between at least one interfering transmitter and the victim transmitter; and
   determining the power of the each interfering intermodulation product at the victim transmitter $P_{INTatTX}$ as follows:

$$P_{INTatTX} = L_{MIN} + \text{ConversionLoss(order)}$$

where $L_{MIN}$ is the minimum leakage power of the at least one interfering transmitter at the victim transmitter.

10. The process according to claim 9 further comprising the step of, for each interfering intermodulation product, determining the intermodulation product power level $P_{INTatRX}$ at receiver $RX_\beta$ by summing the losses in the coupling $C_{T1,R\beta}$ between the victim transmitter and the receiver $R_{X\beta}$:

$$P_{INTatRX} = P_{INTatTX} + C_{T1,R\beta}.$$

11. The process according to claim 10 further comprising the step of comparing the intermodulation product power level $P_{INTatRX}$ at receiver $R_\beta$ to the susceptibility of the receiver $S_{R\beta}$ to determine if interference is caused at receiver $RX_\beta$.

12. In a process for determining intermodulation interference in a receiver between two or more transmitters and the receiver, the steps of:

a) determining a minimum susceptibility to interference of the receiver;

b) for each transmitter, determining a highest order intermodulation product generated as a result of interference between the transmitter and the receiver with a power level sufficient to exceed the minimum susceptibility of the receiver, and storing the highest order intermodulation product for each transmitter; and c) separately considering each transmitter as a victim transmitter, and for each victim transmitter determining the intermodulation products generated in the receiver as a result of interference between the victim transmitter and all of the at least one other transmitters, each other transmitter having a leakage power to the victim transmitter, the one of the at least one other transmitters having the lowest leakage power to the receiver being the minimum leakage transmitter, the intermodulation products being determined in this step up to the highest order intermodulation product of the minimum leakage transmitter determined in step (b).

13. The process according to claim 12 wherein the susceptibility to interference of the receiver is determined by the steps of:

determining a noise level at the receiver by subtracting a carrier-to-noise ratio of the receiver from a usable sensitivity of the receiver; and determining the susceptibility at the receiver by subtracting 6 dB from the noise level at the receiver.

14. The process according to claim 12 wherein the step of determining a highest order intermodulation product generated as a result of interference between the victim transmitter and each other individual transmitter with a power level sufficient to exceed the minimum susceptibility at the receiver comprises the steps of:

for each transmitter, calculating the leakage power from the transmitter to the receiver as $$L_{T1,R1} = P_{T1} - C_{T1,R1}$$

where $P_{T1}$ is the leakage power of the transmitter and $C_{T1,R1}$ is the coupling loss between the transmitter and the receiver; and for each transmitter at each order, determining the power level $P_{INTatRX}$ for such transmitter $$P_{INTatRX} = L_{T2,R1} - (\text{Order}-1)*(\text{InterceptPoint(order)} - L_{T2,R1})$$

and comparing the power level $P_{INTatRx}$ to the minimum susceptibility at the receiver.

15. The process according to claim 12 further comprising the step of storing the highest order intermodulation product for each transmitter in a matrix.

16. The process according to claim 12 further comprising the following step after the step of determining the intermodulation products generated in the receiver up to the highest order intermodulation product of the minimum leakage transmitter:

for each such intermodulation product, determining an intermodulation product frequency $F_{INT}$ and an intermodulation product bandwidth $BW_{INT}$ as follows:

$$F_{INT} = \pm M_1 \times F_{T1} \pm M_2 \times F_{T2} + \ldots \pm M_\alpha \times F_{T\alpha}$$
$$BW_{INT} = M_1 \times BW_{T1} + M_2 \times BW_{T2} + \ldots + M_\alpha \times BW_{T\alpha}$$

where $[M_1, M_2, \ldots, M_\alpha]$ are positive integers.

17. The process according to claim 16 further comprising the following steps after the step of determining the intermodulation product frequency $F_{INT}$ and intermodulation product bandwidth $BW_{INT}$:

comparing each intermodulation product frequency to the frequency band of the receiver to determine if the frequency band of any intermodulation product falls within the frequency band of the receiver, the intermodulation products with frequencies falling within the frequency band of the receiver being interfering intermodulation products; and determining the power of each interfering intermodulation product at the victim receiver $P_{INTatRX}$ as follows:

$$P_{INTatRX} = L_{MIN} - (\text{Order}-1)*(\text{InterceptPoint(order)} - L_{MIN})$$

where $L_{MIN}$ is the minimum leakage power of the interfering transmitters at the receiver.

18. The process according to claim 17 further comprising the step of comparing the intermodulation product power level $P_{INTatRX}$ at the receiver to the susceptibility of the receiver to determine if interference is caused at the receiver.

19. An apparatus for determining intermodulation interference between two or more transmitters and one or more receivers, the apparatus comprising:

means for determining a minimum susceptibility to interference of the one or more receivers at each transmitter;

means for separately considering each transmitter as a victim transmitter and for determining and storing a highest order intermodulation product generated as a result of interference between the victim transmitter and each other transmitter individually with a power level sufficient to exceed the minimum susceptibility at the victim transmitter; and means for separately considering each transmitter as a victim transmitter and for determining the intermodulation products generated as a result of interference between the victim transmitter and all of the at least one other transmitters, each other transmitter having a leakage power to the victim transmitter, the one of the at least one other transmitters with the lowest leakage power to the victim transmitter being the minimum leakage transmitter, the intermodulation products being determined up to the highest order intermodulation product stored for the minimum leakage transmitter and victim transmitter.

20. The apparatus according to claim 19 wherein the means for determining the minimum susceptibility of the one or more receivers at each transmitter comprises:

means for separately considering each transmitter as victim transmitter and for determining the susceptibility of each receiver at the victim transmitter; and means for determining the minimum of the susceptibilities of the one or more receivers at the victim transmitter.

21. The apparatus according to claim 20 wherein the means for determining the susceptibility of each receiver at the victim transmitter subtracts the coupling loss between such receiver and the victim transmitter from the susceptibility to interference of such receiver at the receiver to determine the susceptibility of such receiver at the victim transmitter.

22. The apparatus according to claim 21 wherein the means for determining the susceptibility of each receiver at the victim transmitter determines the coupling loss between each receiver and the victim transmitter by summing the coupling losses, at the frequency of the receiver, between the receiver and an antenna of the receiver, between the antenna of the receiver and an antenna of the victim transmitter, and between the antenna of the victim transmitter and the victim transmitter.

23. The apparatus according to claim 21 wherein the means for determining the susceptibility of each receiver at the victim transmitter determines the susceptibility to interference of the receiver by:
    determining a noise level at the receiver by subtracting a carrier-to-noise ratio of the receiver from a usable sensitivity of the receiver; and
    determining the susceptibility of the receiver by subtracting 6 dB from the noise level at the receiver.

24. The apparatus according to claim 19 wherein the means for determining a highest order intermodulation product generated as a result of interference between the victim transmitter and each other individual transmitter with a power level sufficient to exceed the minimum susceptibility at the victim transmitter comprises:
    means determining the power level $P_{INTatTX}$ for each individual transmitter at each order as the sum of the power leakage $L_{T2,T1}$ between such transmitter and the victim transmitter and the conversion loss for the victim transmitter at such order; and
    means for comparing the power level $P_{INTatTX}$ to the minimum susceptibility at the victim transmitter.

25. The apparatus according to claim 19 wherein the means for storing the highest order intermodulation product stores the highest order intermodulation product for each transmitter-victim transmitter pair in a matrix.

26. The apparatus according to claim 19 further comprising means for determining, after determining the intermodulation products up to the highest order intermodulation product of the minimum leakage transmitter-victim transmitter pair, for each such intermodulation product, an intermodulation product frequency $F_{INT}$ and an intermodulation product bandwidth $BW_{INT}$ as follows:

$$F_{INT} = \pm M_1 \times F_{T1} \pm M_2 \times F_{T2} + \ldots + M_\alpha \times F_{T\alpha}$$

$$BW_{INT} = M_1 \times BW_{T1} + M_2 \times BW_{T2} + \ldots + M_\alpha \times BW_{T\alpha}$$

where $[M_1, M_2, \ldots, M_\alpha]$ are positive integers.

27. The apparatus according to claim 26 further comprising means for comparing, after determining the intermodulation product frequencies $F_{INT}$ and intermodulation product bandwidths $BW_{INT}$, each intermodulation product frequency to the frequency band of each receiver to determine if the frequency band of any intermodulation product falls within the frequency band of any receiver;
    means for identifying interfering intermodulation products, each with an intermodulation product frequency falling within the band of one of the one or more receivers $RX_\beta$ at frequency $F_{R\beta}$, each interfering intermodulation product being generated by intermodulation between at least one interfering transmitter and the victim transmitter; and
    means for determining the power of each interfering intermodulation product at the victim transmitter $P_{INTatTX}$ as follows:

$$P_{INTatTX} = L_{Min} + \text{ConversionLoss(order)}$$

where $L_{Min}$ is the minimum leakage power of the interfering transmitters at the victim transmitter.

28. The apparatus according to claim 27 further comprising means for, for each interfering intermodulation product, determining the intermodulation product power level $P_{INTatRX}$ at receiver $RX_\beta$ by summing the losses in the coupling $C_{T1,R\beta}$ between the victim transmitter and the receiver $RX_\beta$ as follows:

$$P_{INTatRX} = P_{INTatTX} + C_{T1,R\beta}.$$

29. The apparatus according to claim 28 further comprising means for comparing the intermodulation product power level $P_{INTatRX}$ at receiver $R_\beta$ to the susceptibility of the receiver $S_{R\beta}$ to determine if interference is caused at receiver $RX_\beta$.

30. An apparatus for determining intermodulation interference in a receiver between two or more transmitters and the receiver, the apparatus comprising:
    means for determining a minimum susceptibility to interference of the receiver;
    means for determining and storing, for each transmitter, a highest order intermodulation product generated as a result of interference between the transmitter and the receiver with a power level sufficient to exceed the minimum susceptibility of the receiver; and
    means for separately considering each transmitter as a victim transmitter and for determining the intermodulation products generated in the receiver as a result of interference between the victim transmitter and all of the at least one other transmitters, each other transmitter having a leakage power to the victim transmitter, the one of the at least one other transmitters having the lowest leakage power to the receiver being the minimum leakage transmitter, the intermodulation products being determined up to the highest order intermodulation product of the minimum leakage transmitter.

31. The apparatus according to claim 30 wherein the means for determining and storing the highest order intermodulation product comprises:
    means for determining a noise level at the receiver by subtracting a carrier-to-noise ratio of the receiver from a usable sensitivity of the receiver; and
    means for determining the susceptibility at the receiver by subtracting 6 dB from the noise level at the receiver.

32. The apparatus according to claim 30 wherein the means for determining and storing the highest order intermodulation product generated as a result of interference between the victim transmitter and each other individual transmitter with a power level sufficient to exceed the minimum susceptibility at the receiver comprises:
    means for determining, for each transmitter, the leakage power from the transmitter to the receiver as $$L_{T1,R1} = P_{T1} - C_{T1,R1}$$

where $P_{T1}$ is the leakage power of the transmitter and $C_{T1,R1}$ is the coupling loss between the transmitter and the receiver; and means for determining, for each transmitter at each order, the power level $P_{INTatRX}$ for such transmitter $$P_{INTatRX}=L_{T2,R1}-(Order-1)*(InterceptPoint(order)-L_{T2,R1})$$

and for comparing the power level $P_{INTatRx}$ to the minimum susceptibility at the receiver.

33. The apparatus according to claim 30 wherein the means for storing the highest order intermodulation product stores the highest order intermodulation product for each transmitter in a matrix.

34. The apparatus according to claim 30 further comprising means for determining, after determining the intermodulation products generated in the receiver up to the highest order intermodulation product of the minimum leakage transmitter, an intermodulation product frequency $F_{INT}$ and an intermodulation product bandwidth $BW_{INT}$ for each such intermodulation product as follows:

$$F_{INT}=\pm M_1 \times F_{T1} \pm M_2 \times F_{T2}+ \ldots \pm M_\alpha \times F_{T\alpha}$$

$$BW_{INT}=M_1 \times BW_{T1}+M_2 \times BW_{T2}+ \ldots +M_\alpha \times BW_{T\alpha}$$

where $[M_1, M_2, \ldots, M_\alpha]$ are positive integers.

35. The apparatus according to claim 34 further comprising:

means for comparing, after determining the intermodulation product frequency $F_{INT}$ and intermodulation product bandwidth $BW_{INT}$, each intermodulation product frequency to the frequency band of the receiver to determine if the frequency band of any intermodulation product falls within the frequency band of the receiver, the intermodulation products with frequencies falling within the frequency band of the receiver being interfering intermodulation products; and means for determining the power of the each interfering intermodulation product at the victim receiver $P_{INTatRX}$ as follows:

$$P_{INTatRX}=L_{MIN}-(Order-1)*(InterceptPoint(order)-L_{MIN})$$

where $L_{MIN}$ is the minimum leakage power of the interfering transmitters at the receiver.

36. The apparatus according to claim 35 further comprising means for comparing the intermodulation product power level $P_{INTatRX}$ at the receiver to the susceptibility of the receiver to determine if interference is caused at the receiver.

* * * * *